(12) United States Patent
Le Garjan et al.

(10) Patent No.: US 9,641,792 B2
(45) Date of Patent: May 2, 2017

(54) DATA RECORDING DEVICE AND METHOD RELATING TO A TIME SHIFTING FUNCTION ON A RECORDING MEDIUM

(71) Applicant: THOMSON LICENSING, Issy de Molineaux (FR)

(72) Inventors: Bruno Le Garjan, Cesson Sevigne (FR); Vincent Genieux, Acigne (FR); Guillaume Burguiere, Rennes (FR); Andre Magras, St Gregoire (FR); Arnaud Menard, Gosne (FR); Brieuc Thomas, Pire-sur-Seiche (FR); Michel Auffray, Livre sur Changeon (FR); Viviane Bessson, Cesson Sevigne (FR)

(73) Assignee: Thomson Licensing (FR)

(*) Notice: Subject to any disclaimer, the term of this patent is extended or adjusted under 35 U.S.C. 154(b) by 0 days.

(21) Appl. No.: 14/412,671

(22) PCT Filed: Jul. 3, 2013

(86) PCT No.: PCT/EP2013/064033
§ 371 (c)(1),
(2) Date: Jan. 2, 2015

(87) PCT Pub. No.: WO2014/006092
PCT Pub. Date: Jan. 9, 2014

(65) Prior Publication Data
US 2015/0156450 A1    Jun. 4, 2015

(30) Foreign Application Priority Data

Jul. 3, 2012    (FR) ..................................... 12 56377
Jul. 3, 2012    (FR) ..................................... 12 56378

(Continued)

(51) Int. Cl.
  H04N 5/92    (2006.01)
  H04N 5/781    (2006.01)
  G11B 27/00    (2006.01)

(52) U.S. Cl.
  CPC ........... H04N 5/781 (2013.01); G11B 27/005 (2013.01)

(58) Field of Classification Search
  CPC ........ H04N 5/85; H04N 9/8042; H04N 5/781; G11B 27/005

(Continued)

(56) References Cited

U.S. PATENT DOCUMENTS 7,558,869 B2    7/2009 Leon et al.
7,640,566 B1    12/2009 Taylor et al.

(Continued)

FOREIGN PATENT DOCUMENTS

CN    101212620    7/2008
EP    2150045    2/2010

(Continued)

OTHER PUBLICATIONS

Gangadharan et al. "Video quality driven buffer sizing via frame drops", Embedded and real-time computing systems and applications (RTCSA), 2011 IEEE17th International conference, IEEE, Aug. 28, 2011, pp. 319-328.

(Continued)

*Primary Examiner* — Thai Tran
*Assistant Examiner* — Mishawn Hunter
(74) *Attorney, Agent, or Firm* — Jack Schwartz & Associates, PLLC

(57) ABSTRACT

The invention relates to a device and a method for recording data on a recording medium. The invention relates to the implementation of the timeshift function in a part of said recording medium called the timeshift buffer memory hav- (Continued)

ing a size defined in terms of recording capacity. For the timeshift buffer memory, a first threshold defines a capacity limit, a second threshold defines a recording time limit. The device records the data in the timeshift buffer memory as long as the second threshold is not reached and when the second threshold is reached before the first threshold, the processor truncates the start of the timeshift buffer memory when the data being read are not located at the start of the buffer memory or moves to reading the data of the timeshift buffer memory when the data being read are located at the start of the timeshift buffer memory.

17 Claims, 11 Drawing Sheets

(30) Foreign Application Priority Data

| Jul. 3, 2012 | (FR) | 12 56379 |
|---|---|---|
| Jul. 3, 2012 | (FR) | 12 56380 |
| Jul. 3, 2012 | (FR) | 12 56381 |
| Jul. 3, 2012 | (FR) | 12 56383 |
| Jul. 3, 2012 | (FR) | 12 56384 |

(58) Field of Classification Search
USPC .................. 386/248, 326, 335, 349, 295
See application file for complete search history.

(56) References Cited

U.S. PATENT DOCUMENTS

| 2002/0172497 | A1 | 11/2002 | Tada |
| 2003/0108331 | A1 | 6/2003 | Plourde, Jr. |
| 2003/0118321 | A1 | 6/2003 | Sparrell et al. |
| 2003/0147631 | A1 | 8/2003 | Zimmermann |
| 2004/0128692 | A1 | 7/2004 | Wolfe et al. |
| 2005/0141382 | A1* | 6/2005 | Yamamuro ............ H04N 5/76 369/53.31 |
| 2006/0171658 | A1 | 8/2006 | Jochemsen et al. |
| 2007/0201825 | A1 | 8/2007 | Kim |
| 2009/0161765 | A1 | 6/2009 | Joyce et al. |
| 2009/0204994 | A1 | 8/2009 | Kaminski et al. |
| 2011/0075985 | A1 | 3/2011 | Potrebic et al. |
| 2011/0305440 | A1 | 12/2011 | Plourde, Jr. et al. |

FOREIGN PATENT DOCUMENTS

| JP | 2007293502 | 11/2007 |
| JP | 2009135747 | 6/2009 |
| JP | 2010074728 | 4/2010 |
| JP | 2010232850 | 10/2010 |
| WO | 03041387 | 5/2003 |
| WO | WO2004100539 | 11/2004 |
| WO | 2010054719 | 5/2010 |

OTHER PUBLICATIONS

Samsung: "Imaging the possibilities"; Led TV user manual, Dec. 31, 2010, http://content.etilize.com/User-Manual/1017245148.pdf; Series 8; pp. 1-66.
Search Report Dated Aug. 5, 2013.
ETSI EN 300 468 V1.13.1, "Digital Video Broadcasting (DVB); Specification for Service Information (SI) in DVB systems", European Telecommunications Standards Institute, Apr. 2012, pp. 1-144.

* cited by examiner

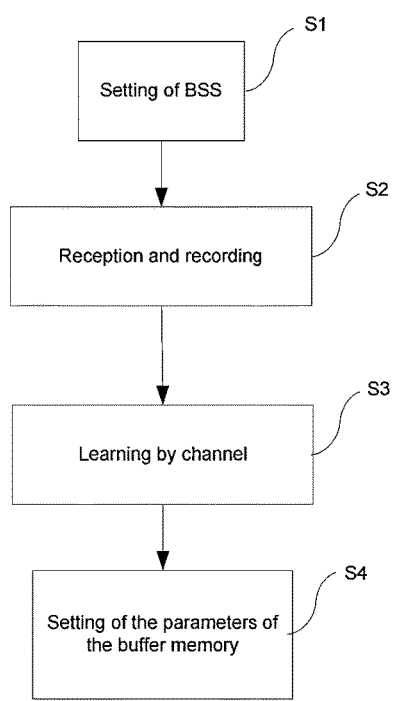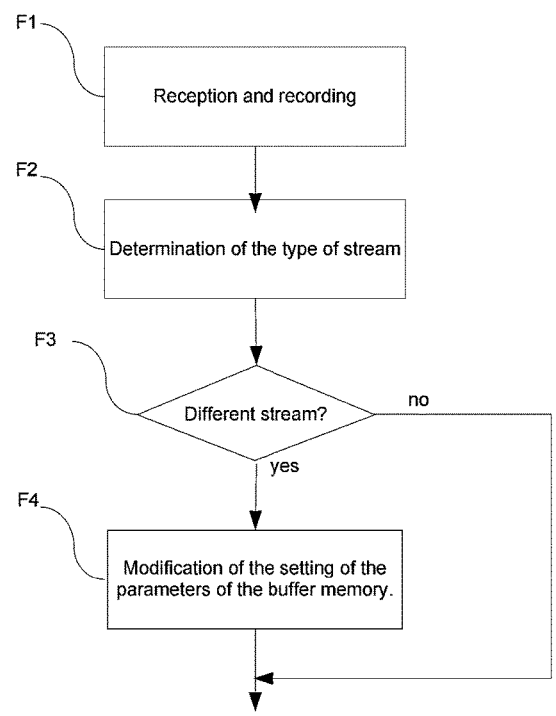
Fig 4                    Fig 5

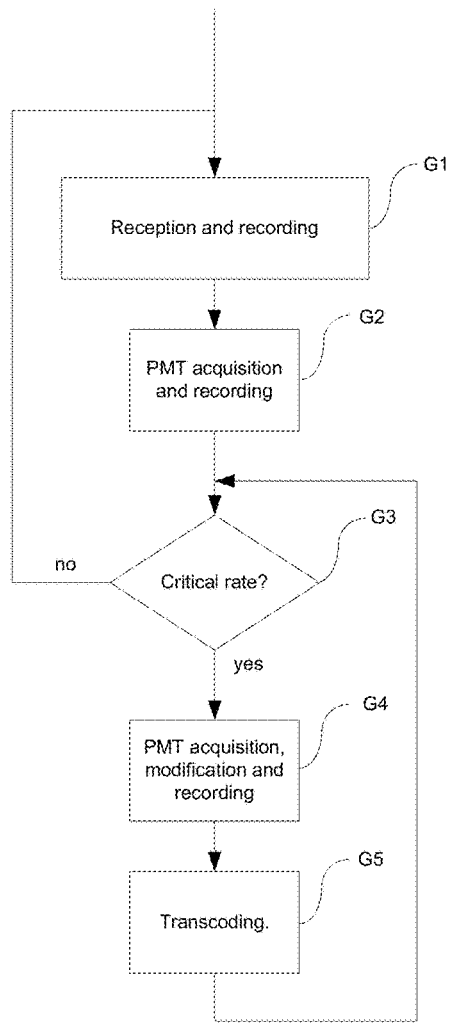
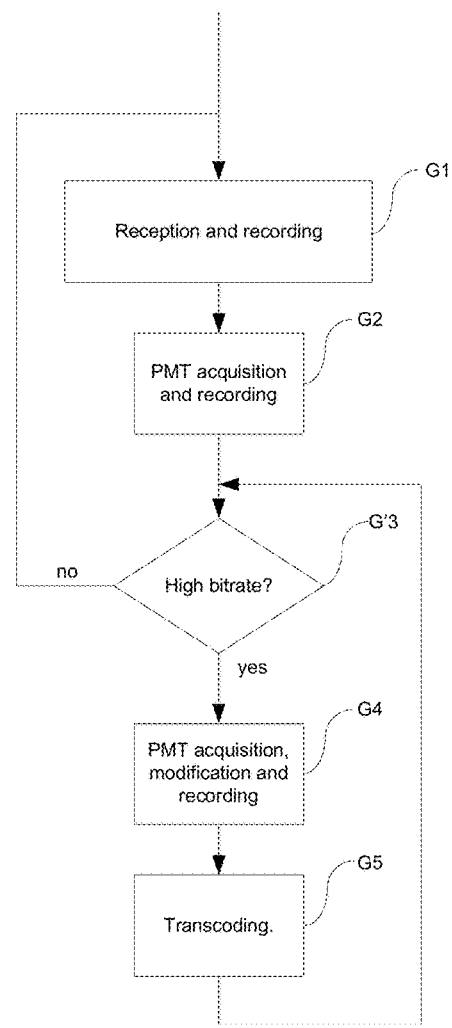
Fig 6a
Fig 6b

DATA RECORDING DEVICE AND METHOD RELATING TO A TIME SHIFTING FUNCTION ON A RECORDING MEDIUM

This application claims the benefit, under 35 U.S.C. §365 of International Application PCT/EP2013/064033, filed Jul. 3, 2013, which was published in accordance with PCT Article 21(2) on Jan. 9, 2014 in French and which claims the benefit of French patent applications:

No. 1256380 filed on Jul. 3, 2012;
No. 1256377 filed on Jul. 3, 2012;
No. 1256378 filed on Jul. 3, 2012;
No. 1256379 filed on Jul. 3, 2012;
No. 1256381 filed on Jul. 3, 2012;
No. 1256383 filed on Jul. 3, 2012;
No. 1256384 filed on Jul. 3, 2012.

The invention relates to a device and a method for recording data on a recording medium implementing a timeshift function.

The present invention relates to a method and a device for deferred playback of digital video data. This function is also called a timeshift function.

Video documents coded in the form of digital data offer numerous processing possibilities.

The invention relates more specifically to the deferred playback of data recorded on a recording medium, which consists in recording a programme on a recording medium in a file, several files or any zone, while simultaneously replaying this programme with a certain delay. This application enables the user to suspend the replay of the programme when he wants and to resume from where it stopped.

The known devices, notably devices of digital television decoder type, making it possible to implement methods for deferred replay present numerous disadvantages.

Among these known devices, some offer methods wherein the quantity of storage resources being adapted to be allocated to a file other than the deferred replay file depend on the other applications performed by the device. This gives rise to numerous disadvantages:

On one hand, the deferred playback file can no longer have new resources at its disposal to continue the storage of data.

On the other hand, the storage capacity allocated to the deferred playback method not being controlled, it is possible that this method occupies too large a quantity of storage data of the decoder, thus generating malfunctions of the decoder, for example for performing other applications not being able to access a required storage capacity.

Moreover, when the deferred playback method is used simultaneously to other applications requiring a data storage, the management of the storage space allocated to each application proves complex and difficult. This problem is especially noticeable when the storage capacity is reduced and this is the case when the decoders possess only memories of RAM (Random Access Memory) or flash type of more limited capacity than that of hard discs.

When the timeshift buffer memory is full, the start of the timeshift buffer memory is truncated and space is freed up for recording the rest of the data received. It can thus be seen that if the user plays the data with a large timeshift with respect to their being written to the timeshift buffer memory, the read pointer is at the start of the timeshift buffer memory, it is very possible that the new data received erase data which have not yet been read or cannot be written. In this case, the read pointer will jump within the buffer memory, which gives a much disrupted playback for the user since the display of data jumps in time.

This phenomenon is accentuated when the bitrates of the data received vary over time and continue to increase. Programme broadcasters frequently broadcast television channels at variable bitrates. A same channel not having a constant bitrate, it is difficult to predict the capacity of the buffer memory necessary for adapting to these bitrate fluctuations and avoiding too many jumps in time, due to truncations of the buffer memory.

It is therefore important to set the parameters of the buffer memory so as to avoid such jumps in time or at least to reduce them.

A first invention proposes a device for receiving and recording data on a recording medium, the device comprising a processor for implementing a timeshift function in a part of the recording medium called timeshift buffer memory, characterised in that it comprises Means for defining a first threshold defining a capacity limit of the timeshift buffer memory and Means for defining a second threshold defining a time limit for recording in the timeshift buffer memory and The processor records the data in the timeshift buffer memory as long as the second threshold is not reached and when the second threshold is reached before the first threshold, the processor truncates the start of the timeshift buffer memory when the data being read are not located at the start of the buffer memory or moves to reading the data of the timeshift buffer memory when the data being read are located at the start of the timeshift buffer memory.

Advantageously, the processor comprises means for analysing during each reception of a data channel at least the average bitrate of each channel, means for adjusting the second threshold according to at least the average bitrate.

Advantageously, the means for analysing the average bitrate also analyse the maximum bitrate of each channel, the means for adjusting the recording time limit then adjusting the limit according to said average bitrate and to the maximum bitrate of each channel.

Advantageously, the recording time limit is adjusted for each channel according to its average bitrate.

Advantageously, the capacity is adjusted for each channel according to its average bitrate and to its maximum bitrate.

Preferably, the processor comprises means for analysing the type of data received, means for adjusting the second threshold according to the type of data received.

Preferentially, the type comprises:

Audio data,

Standard definition video data,

High definition video data.

Advantageously, the processor comprises

Means for detecting a filling threshold of the buffer memory.

Advantageously, the processor comprises means for transcoding the data received when the filling threshold is exceeded.

Advantageously, the processor comprises means for detecting the type of data received.

Advantageously, the processor comprises means for transcoding the data received when the type of data corresponds to data of high bitrate type.

Advantageously, the processor comprises
means for detecting the data relating to the language viewed by the user or to the subtitling watched by the user, when the filling threshold is exceeded,
Means for recording in the timeshift buffer memory only the data detected.

Advantageously, the processor comprises means for detecting the data relating to the language viewed by the user or to the subtitling watched by the user, and means for recording in the timeshift buffer memory only the data detected when the type of data corresponds to data of high bitrate type.

Advantageously, the processor comprises means for recording in the timeshift buffer memory only a percentage less than all of the groups of data received when the data received are coded into groups of data when the filling threshold is exceeded.

Advantageously, the processor comprises means for recording in the timeshift buffer memory only a percentage less than all of the groups of data received when the data received are coded into groups of data when the type of data corresponds to data of high bitrate type.

The first invention also relates to a method for receiving and recording data on a recording medium, in a device comprising a processor for implementing a timeshift function in a part of said recording medium called timeshift buffer memory. According to the invention, the method comprises:
The determination of a first threshold defining a capacity limit of the timeshift buffer memory and
The determination of a second threshold defining a time limit for recording in the timeshift buffer memory and
The recording of the data in the timeshift buffer memory as long as the second threshold is not reached and
when the second threshold is reached before the first threshold, truncation of the start of the timeshift buffer memory when the data being read are not located at the start of the buffer memory or
transition to the mode for reading the data of the timeshift buffer memory when the data being read are located at the start of the timeshift buffer memory.

A second invention relates to a device for receiving and recording data on a recording medium, the device comprising a processor for implementing a timeshift function in a part of said recording medium called timeshift buffer memory having a size defined in terms of recording capacity. According to the invention, the processor comprises:
Means for defining a first threshold defining a capacity limit of the timeshift buffer memory and
means for defining a second threshold defining a time limit for recording in the timeshift buffer memory and
means for defining a third threshold defining a minimum time limit for recording in the timeshift buffer memory
the processor records the data in the timeshift buffer memory as long as at least one of the first threshold or the second threshold is not reached and when at least one of the two thresholds is reached:
if the third threshold is also reached, then
if the read pointer of the processor is in a zone of the timeshift buffer memory wherein the processor must truncate data, the processor moves to the mode for normal reading of the timeshift buffer memory if the pause mode was activated or if the read speed was less than the normal read speed, and
if the read pointer of the processor is not in a zone of the timeshift buffer memory wherein the processor must truncate data, then the processor truncates data in the timeshift buffer memory.

Preferentially, when the processor is reverted to normal speed read mode, then if the filling threshold reaches the size defined in terms of recording capacity, the processor performs a jump with the read pointer.

Preferentially, the processor comprises means for defining the type of data received and means for defining the three thresholds according to the type of data received.

Preferentially, the type of data is chosen from among audio, high definition video or standard definition video type.

Preferentially, the type of data is chosen from among a coding type wherein the data are coded, and preferably when the data are video data, from among MPEG-2 or H-264 type.

Preferentially, the processor comprises
means for analysing during each reception of a data channel at least the average bitrate of each channel,
means for defining the value of the three thresholds according to the average bitrate of each channel, for each channel received.

Preferentially, the means for analysing the average bitrate also analyse the maximum bitrate of each channel and the means for defining the value of the three thresholds define the values of each threshold according to the average bitrate and to the maximum bitrate of each channel.

Preferentially, the device comprises
means for determining that the timeshift buffer memory has reached a filling threshold called the critical threshold.

According to an embodiment of the invention, the device comprises means for transcoding the data received.

According to an embodiment of the invention, the means for transcoding the data received transcode the data received only when the critical threshold is reached.

According to an embodiment of this second invention, the device comprises means for recording in the timeshift buffer memory only a percentage of the groups of data received, when the data received are coded in groups of data.

According to an embodiment of the invention, the means for recording in the timeshift buffer memory only a percentage of the groups of data received does so only when the critical threshold is reached.

According to an embodiment of the invention, the data being coded in a plurality of modes, the modes relating to an audio language or to a subtitling, it comprises
means for detecting the mode wherein the data are decoded,
means for recording in the buffer memory the data only in decoded mode.

According to an embodiment of the invention, the means for recording in the timeshift buffer memory the data only in decoded mode does so only when the critical threshold is reached.

The second invention further relates to a method for receiving and recording data on a recording medium, in a device comprising a processor for implementing a timeshift function in a part of the recording medium called timeshift buffer memory having a size defined in terms of recording capacity; the method comprises
a determination of a first threshold defining a capacity limit of the timeshift buffer memory and,
a determination of a second threshold defining a time limit for recording in the timeshift buffer memory and a determination of a third threshold defining a minimum time limit for recording in the timeshift buffer memory
the recording of the data in the timeshift buffer memory as long as at least one of the first threshold or the second threshold is not reached and when at least one of the two thresholds is reached:
if the third threshold is also reached, then
if the read pointer of the processor is in a zone of the timeshift buffer memory wherein the processor must truncate data, transition to the mode for normal reading of the timeshift buffer memory if the pause mode was activated or if the read speed was less than the normal read speed, and
if the read pointer of the processor is not in a zone of the timeshift buffer memory wherein the processor must truncate data, then truncation of data in the timeshift buffer memory.

A third invention relates to a method for receiving and recording data on a recording medium, the device comprising a processor for implementing a timeshift function in a part of the recording medium called timeshift buffer memory. According to the invention, the device comprises means for detecting a type of data received, and means for adjusting a time limit for recording in the timeshift buffer memory according to the type of data received.

Preferentially, the type of data can be chosen from among data of audio type, data of high definition video type and data of standard definition type.

Preferentially, the data comprise an identifier indicating the type of data, the means for detection in this case reading the type in the data received.

Preferentially, the data are coded in MPEG-2 TS format, the identifier being in this case the PMT field.

Preferentially, the device comprises means for adjusting a size limit defining a capacity of the timeshift buffer memory, according at least to said type of data received.

Preferentially, the means for adjusting a time limit also adjust a minimum time limit guaranteeing a time for recording in the timeshift buffer memory irrespective of the maximum bitrate of the data received, according at least to said type of data received.

Advantageously, the device according to this third invention comprises means for transcoding the data received prior to their recording in the timeshift buffer memory.

Advantageously, the data being coded in a plurality of modes, the modes relating to an audio language or to a subtitle, the processor comprises means for detecting the mode wherein the data are decoded, and means for recording, in the timeshift buffer memory, the data only in the single decoded mode.

Preferentially, the data being audiovisual data coded into groups of video data and into groups of data, the device comprises means for recording in the buffer memory only a percentage less than all of the groups of video data received and all the groups of audio data.

Preferentially the means for transcoding the data received prior to their recording in the timeshift buffer memory transcode the data only when the filling of the timeshift buffer memory is greater than a first threshold or when the bitrate of the data received is greater than first threshold.

According to a preferred embodiment of this third invention, the means for recording, in the timeshift buffer memory, the data only in the single decoded mode do so only when the filling of the timeshift buffer memory is greater than a first threshold or when the bitrate of the data received is greater than first threshold.

This third invention also relates to a method for receiving and recording data on a recording medium, in a device comprising a processor for implementing a timeshift function in a part of said recording medium called timeshift buffer memory, characterised in that it comprises the steps of:
detection of the type of data received,
adjustment of a time limit for recording in the timeshift buffer memory according to said type of data received.

A fourth invention relates to a device for receiving and recording data on a recording medium, the device comprising a processor for implementing a timeshift function in a part of the recording medium called timeshift buffer memory; the processor comprising:
means for initialising the buffer memory so as to make its recording time capacity equal to a fixed threshold,
means for analysing during each reception of a data channel at least the average bitrate of each channel,
means for adjusting the recording time capacity of the buffer memory to a value greater than the threshold value according to the at least average bitrate.

According to an embodiment of the fourth invention, the means for analysing the average bitrate also analyse the maximum bitrate of each channel, the means for adjusting the recording time capacity then adjusting the capacity according to the average bitrate and to the maximum bitrate of each channel.

According to an embodiment of the fourth invention, the capacity is adjusted for each channel according to its average bitrate.

According to an embodiment of the fourth invention, the capacity is adjusted for each channel according to its average bitrate and to its maximum bitrate.

According to an embodiment of the fourth invention, the device comprises means for adjusting a size limit (BSB) defining a capacity of the timeshift buffer memory according at least to the average bitrate.

According to an embodiment of the fourth invention, the means for adjusting a size limit defining a capacity of the timeshift buffer memory according at least to the average bitrate adjust the size also according to the maximum bitrate.

According to an embodiment of the fourth invention, the means for adjusting a time limit also adjust a minimum time limit (MBSS) guaranteeing a time for recording in the timeshift buffer memory irrespective of the maximum bitrate of the data received, according at least to the average bitrate.

According to an embodiment of the fourth invention, the minimum time limit is adjusted according to the average bitrate and to the maximum bitrate.

According to an embodiment of the fourth invention, the device comprises means for transcoding the data received prior to their recording in the timeshift buffer memory.

According to an embodiment of the fourth invention, the data are coded in a plurality of modes, the modes relating to an audio language or to a subtitle, the processor comprises:
means for detecting the mode wherein the data are decoded,
means for recording, in the timeshift buffer memory, the data only in the single decoded mode.

According to an embodiment of the fourth invention, the data are audiovisual data coded into groups of video data and into groups of audio data, it comprises means for recording in the buffer memory only a percentage less than all of the groups of video data received and all the groups of audio data.

According to an embodiment of the fourth invention, the means for transcoding the data received prior to their recording in the timeshift buffer memory transcode the data only when the filling of the timeshift buffer memory is greater than a first threshold or when the bitrate of the data received is greater than first threshold.

According to an embodiment of the fourth invention, the means for recording, in the timeshift buffer memory, the data only in the single decoded mode does so only when the filling of the timeshift buffer memory is greater than a first threshold or when the bitrate of the data received is greater than first threshold.

The fourth invention also relates to a method for receiving and recording data on a recording medium, in a device comprising a processor for implementing a timeshift function in a part of the recording medium called timeshift buffer memory, the method comprising the steps of:
  initialising the buffer memory so as to make its recording time capacity equal to a fixed threshold,
  analysing, during each reception of a data channel, at least the average bitrate of each channel,
  adjusting the recording time capacity of the buffer memory to a value greater than the threshold value according to at least the average bitrate.

A fifth invention relates to a device for receiving and recording audiovisual data on a recording medium, the device comprising a processor for implementing a timeshift function in a part of the recording medium called timeshift buffer memory, the data being coded in different modes. According to the invention the processor comprises means for transcoding the data received in order to reduce the quantity of data to be recorded before recording them in the timeshift buffer memory.

Advantageously, this last device comprises means for detecting that the buffer memory has reached a filling rate greater than a first predetermined threshold value.

Advantageously, the means for transcoding the data received transcode the data received only when the first threshold value is exceeded.

Advantageously, this last device comprises means for detecting the bitrate of the data received.

Advantageously, the means for transcoding the data received transcode the data received only when the bitrate is greater than a determined bitrate.

Advantageously, this last device comprises means for detecting the audio language and the subtitles selected and for recording, in the timeshift buffer memory, the data only in the audio language selected and the subtitles selected.

Advantageously, the means for detecting the audio language and the subtitles selected record, in the timeshift buffer memory, the data only in the audio language selected and the subtitles selected only when the timeshift buffer memory has reached a second threshold value at least equal to the first threshold value.

Advantageously, the means for detecting the audio language and the subtitles selected record, in the timeshift buffer memory, the data only in the audio language selected and the subtitles selected only when the bitrate is greater than a second determined bitrate, the second bitrate being greater than the first bitrate.

Advantageously, the data received are coded into groups of data, the device further comprises means for recording only a part of the groups of data in the timeshift buffer memory.

Preferentially, the means for recording only a part of the groups of data in the timeshift buffer memory record only a part of the groups of data only when the filling of the timeshift buffer memory has reached a third threshold value at least equal to the second threshold value.

According to an embodiment of the invention, the means for recording only a part of the groups of data in the timeshift buffer memory record only a part of the groups of data only when the bitrate is greater than a second determined bitrate, the second bitrate being greater than the first bitrate.

According to an embodiment of this last invention, the data are audiovisual data, it comprises means for detecting a field in the data relating at least to the coding bitrate, means for modifying the field according to the transcoding and means for associating the modified field value with a time position in the data, the time position relating to the instant at which the data started to be transcoded.

The fifth invention also relates to a method for receiving and recording audiovisual data on a recording medium, in a device comprising a processor for implementing a timeshift function in a part of the recording medium called timeshift buffer memory, the data being coded in different modes; the method comprising a step of transcoding the data received in order to reduce the quantity of data to be recorded before recording them in the timeshift buffer memory.

A sixth invention relates to a device for receiving and recording audiovisual data on a recording medium, the device comprising a processor for implementing a timeshift function in a part of the recording medium called timeshift buffer memory, the data being coded in a plurality of modes, the modes relating to an audio language or to a subtitling. According to the invention, the processor comprises
  means for detecting the mode wherein the data are decoded,
  means for recording, in the timeshift buffer memory, the data only in the single decoded mode.

According to an embodiment of this sixth invention, the means for recording in the timeshift buffer memory only the data in a single decoded mode are adapted to trigger recording when the filling threshold of the buffer memory is greater than a first predetermined value.

According to an embodiment of this sixth invention, the means for recording in the timeshift buffer memory only the data in a single decoded mode are adapted to trigger recording when the bitrate of the data received is greater than a predetermined value.

According to an embodiment of this sixth invention, when the data are coded according to the MPEG-2 or MPEG-4 standard, the PMT tables associated with the data are modified prior to their recording.

According to an embodiment of this sixth invention, the processor further comprises:
  means for detecting the filling rate of the timeshift memory following the recording of the data in the single decoded mode,
  means for recording, in the timeshift buffer memory, only a part of the groups of data received, when the data are coded into groups of data, when the filling rate is greater than a second threshold greater than the first threshold.

According to an embodiment of this sixth invention, the processor further comprises:
  means for detecting the filling rate of the timeshift buffer memory following the recording of said data in the single decoded mode,
  means for transcoding the data in the single decoded mode prior to their recording in the timeshift buffer memory when the filling rate is greater than a third threshold greater than said first threshold.

According to an embodiment of this sixth invention, the processor further comprises:
means for transcoding the part of the groups of data in the single decoded mode prior to their recording in the timeshift buffer memory when the filling rate is greater than a fourth threshold greater than said second threshold.

The sixth invention also relates to a method for receiving and recording audiovisual data on a recording medium, in a device comprising a processor for implementing a timeshift function in a part of the recording medium called timeshift buffer memory, the data being coded in a plurality of modes, the modes relating to an audio language or to a subtitling characterised in that the method comprises
a step of detecting the mode wherein the data are decoded,
a step of recording, in the timeshift buffer memory, only the data in a single decoded mode.

A seventh invention relates to a device for receiving and recording data on a recording medium, the device comprising a processor for implementing a timeshift function in a part of said recording medium called timeshift buffer memory, the data being audiovisual data coded into groups of video data and into groups of audio data.

According to the invention, the device comprises means for recording in the memory only a percentage less than all of the groups of video data received and all the groups of audio data.

According to an embodiment of this seventh invention, the means for recording in the memory only a percentage less than all of the groups of video data received and all the groups of audio data, select a group of data from x groups of data received, x depending on the bitrate of the data received.

According to an embodiment of this seventh invention, the device further comprises means for detecting that the buffer memory has reached a filling rate greater than a first predetermined threshold.

According to an embodiment of this seventh invention, the means for recording in the buffer memory only a percentage of the groups of video data, record the percentage only if the filling of the buffer memory has reached the threshold.

According to an embodiment of this seventh invention, a percentage of the groups of video data is recorded, the percentage being proportional to the ratio of the bitrate for reading the data from the buffer memory to the bitrate for writing the data to the buffer memory.

According to an embodiment of this seventh invention, the data being coded in a plurality of modes, the modes relating to an audio language or to a subtitling, the processor comprises
means for detecting the mode wherein the data are decoded,
means for recording, in the timeshift buffer memory, the data only in the single decoded mode.

According to an embodiment of this seventh invention, the means for recording in the timeshift buffer memory only the data in a single decoded mode are adapted to trigger recording when the filling threshold of the buffer memory is greater than a second threshold.

According to an embodiment of this seventh invention, the means for recording in the timeshift buffer memory only the data in a single decoded mode are adapted to trigger recording when the bitrate of the data received is greater than a predetermined value.

According to an embodiment of this seventh invention, the processor further comprises:
means for detecting the filling rate of the timeshift buffer memory following the recording of a percentage of the groups of video data,
means for transcoding the percentage of the groups of data to be recorded prior to their recording in the timeshift buffer memory when the filling rate is greater than a third threshold greater than the first threshold.

According to an embodiment of this seventh invention, the processor further comprises:
means for transcoding the part of the groups of data in the single decoded mode prior to their recording in the timeshift buffer memory when the filling rate is greater than a fourth threshold greater than the second threshold.

The seventh invention also relates to a method for receiving and recording data on a recording medium, in a device comprising a processor for implementing a timeshift function in a part of said recording medium called timeshift buffer memory, the data being audiovisual data coded into groups of video data and into groups of audio data. According to the invention, the method comprises a step of recording in the memory only a percentage less than all of the groups of video data received and all the groups of audio data.

The inventions will be better understood and illustrated by means of non-restrictive embodiments and advantageous implementations, with reference to the accompanying drawings, wherein:

FIG. 1 shows a general diagram of a use environment of a decoder according to a preferred embodiment of the inventions proposed, FIG. 2 shows a general diagram of a decoder according to a preferred embodiment of the inventions proposed, FIG. 3 shows a first embodiment of the first invention, FIG. 4 shows a second embodiment of the invention, wherein parameters of the timeshift buffer memory are adjusted according to at least a bitrate of the data received, FIG. 5 shows a third embodiment of the invention, wherein parameters of the timeshift buffer memory are adjusted according to the type of data received, FIGS. 6a and 6b show a first example of bitrate reduction applied to the data received, FIGS. 7a and 7b show a second example of bitrate reduction applied to the data received, FIGS. 8a and 8b show a third example of bitrate reduction applied to the data received.

The modules shown are functional units that may or may not correspond to physically distinguishable units. For example, these modules or some of them can be grouped together in a single component, or constitute functions of the same software. On the contrary, some modules may be composed of separate physical entities.

Figure 1:
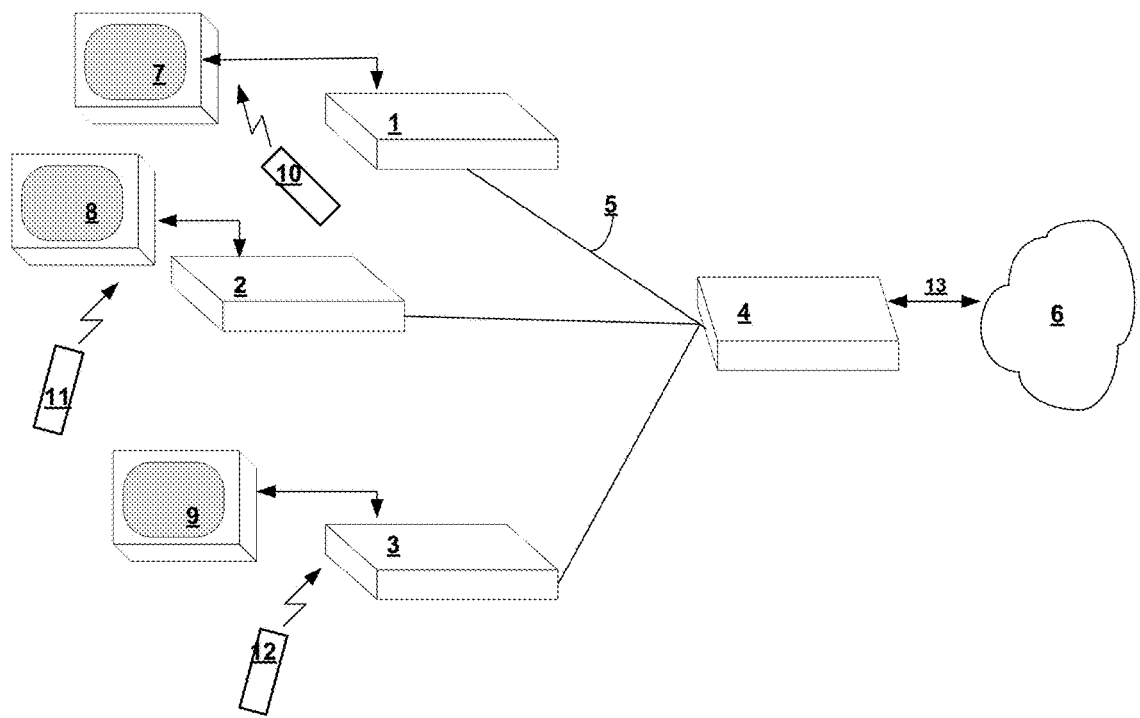
Figure 2:
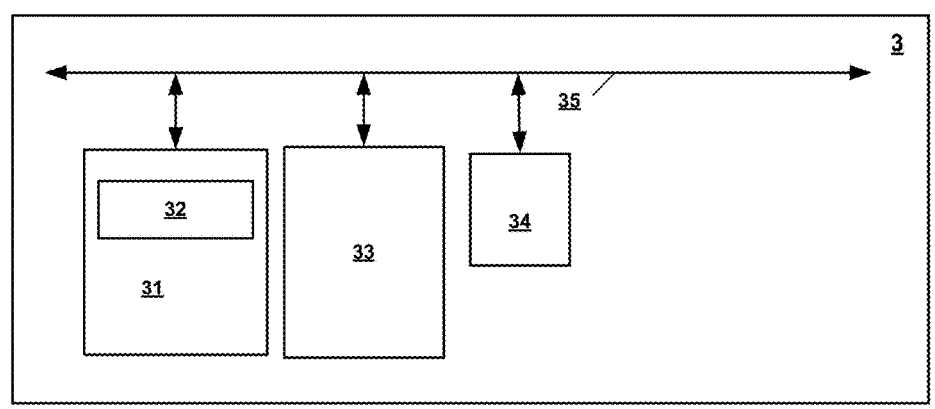

FIGS. 1 and 2 are applicable to all the inventions described in this document.

FIG. 1 shows a system comprising reception devices 1, 2, 3 also called digital decoders implementing the invention. Such devices can be connected to interfaces 4 also called gateways via the intermediary of a local network 5 of ethernet type for example. A main role of the gateways is to connect the devices 1, 2 and 3 to one or more external networks. In FIG. 1, the gateway 4 is connected to an internet service provider (ISP) 6 via the intermediary of a network of ADSL (asynchronous digital subscriber line) type 13. The gateway 1 can also be connected to other types of networks.

The digital decoders 1, 2 and 3 can moreover be connected directly without using a gateway to a programme provider. They can be of cable, satellite, IP multicast or other type and possess their own means for receiving and demodulating signals received by cable or satellite channels.

The invention is therefore not limited to the illustration which is given thereof in FIG. 1 where the decoders 1, 2, 3 are not connected directly to programme providers but via a gateway 4.

Each decoder 1, 2, 3 can be connected respectively to a television set 7, 8, 9. They can also be connected to computers or tablets or other mobile devices, for example equipped with a screen. In the case of a server client configuration, the timeshift function is implemented on the server decoder and displayed on the client decoder (and possibly on the server decoder) or a companion device, for example a tablet or other device.

A remote control device, such as an infra-red remote control 10, 11, 12, respectively controls each decoder 1, 2, 3. These remote controls can also control the television sets 7, 8, 9.

FIG. 2 shows a preferred embodiment of a decoder according to the invention, wherein only the functionalities of the decoder useful to the understanding of the invention can be seen.

The decoder 3 comprises a processor 33 in charge of controlling the main functionalities of the decoder 3. It also comprises a memory 31 of RAM type which can also be of flash type, magnetic disc type, such as a hard disc, or optical disc type or any other type. In this memory, a file 32 is allocated for the management of a timeshift function. A file is understood to mean a file or a zone or a partition carrying a system file making it possible to manage files. According to the preferred embodiment of the invention, the size of this file is 1 GByte.

A bus 35 enables data exchanges and checks between the different components of the decoder.

In normal operation, the decoder 1 receives data from the gateway 4. The data received are recorded in the timeshift buffer memory continuously. This makes it possible, if the user presses a pause button on his remote control in order to stop viewing the channel which he is receiving, to be adapted to play back the data which he has not viewed during the pause subsequently and therefore in non-real time. A typical scenario being for example the reception of a telephone call by the user. He presses pause to interrupt viewing the programme which he is receiving. After 5 mins, he hangs up and wishes to view what has happened during the 5 mins. He thus resumes the playback where it had stopped by viewing the data contained in the timeshift buffer memory. If he wishes, he can also catch up with the live broadcast by viewing the content of the timeshift buffer memory using fast play; otherwise he can continue to view the content of the timeshift buffer memory and will always be 5 mins behind with respect to the live broadcast. In general, it is possible to return using reverse play to the moment when the user changed channel.

However, the size of the timeshift buffer memory is fixed at a maximum size (UBSB), fixed at 1 GByte in the preferred embodiment.

According to the bitrate of the channel being received, the duration of programme contained in 1 GB varies.

For a bitrate of the channel at 12 Mbit/s, the timeshift buffer memory can contain around 11 mins of programme.

For a bitrate of the channel at 8 Mbits, the timeshift buffer memory can contain around 16 mins of programme.

For a bitrate of the channel at 4 Mbits, the timeshift buffer memory can contain around 32 mins of programme.

For a bitrate of the channel at 2 Mbits, the timeshift buffer memory can contain around 64 mins of programme.

According to the prior art, when the timeshift buffer memory is full or has reached a certain threshold in terms of filling rate, the start is truncated (that is to say erased) and the new data received are written. The timeshift buffer memory is represented by a file of fixed size and not a circular buffer, in the preferred embodiment. We therefore do not necessarily rewrite over the erased cells but we keep the size of the file constant, in bytes.

In other embodiments, the timeshift buffer memory can be of circular buffer type. In any event, the timeshift memory can be seen as a memory of circular type from a logical point of view.

With the data relating to the different bitrates, given above, it is therefore noted that when based on a fixed timeshift buffer memory size, we have completely different recording durations according to the bitrate of the channel. This can be disturbing for the user who does not observe the same performance for his decoder according to the bitrate of the channel received.

The filling threshold in bytes for the timeshift buffer memory is called BSB.

We thus define according to a first embodiment of the invention another threshold defining a time limit called BSS. This limit defines a capacity in minutes for filling the timeshift buffer memory, for example 15 mins.

Figure 3:
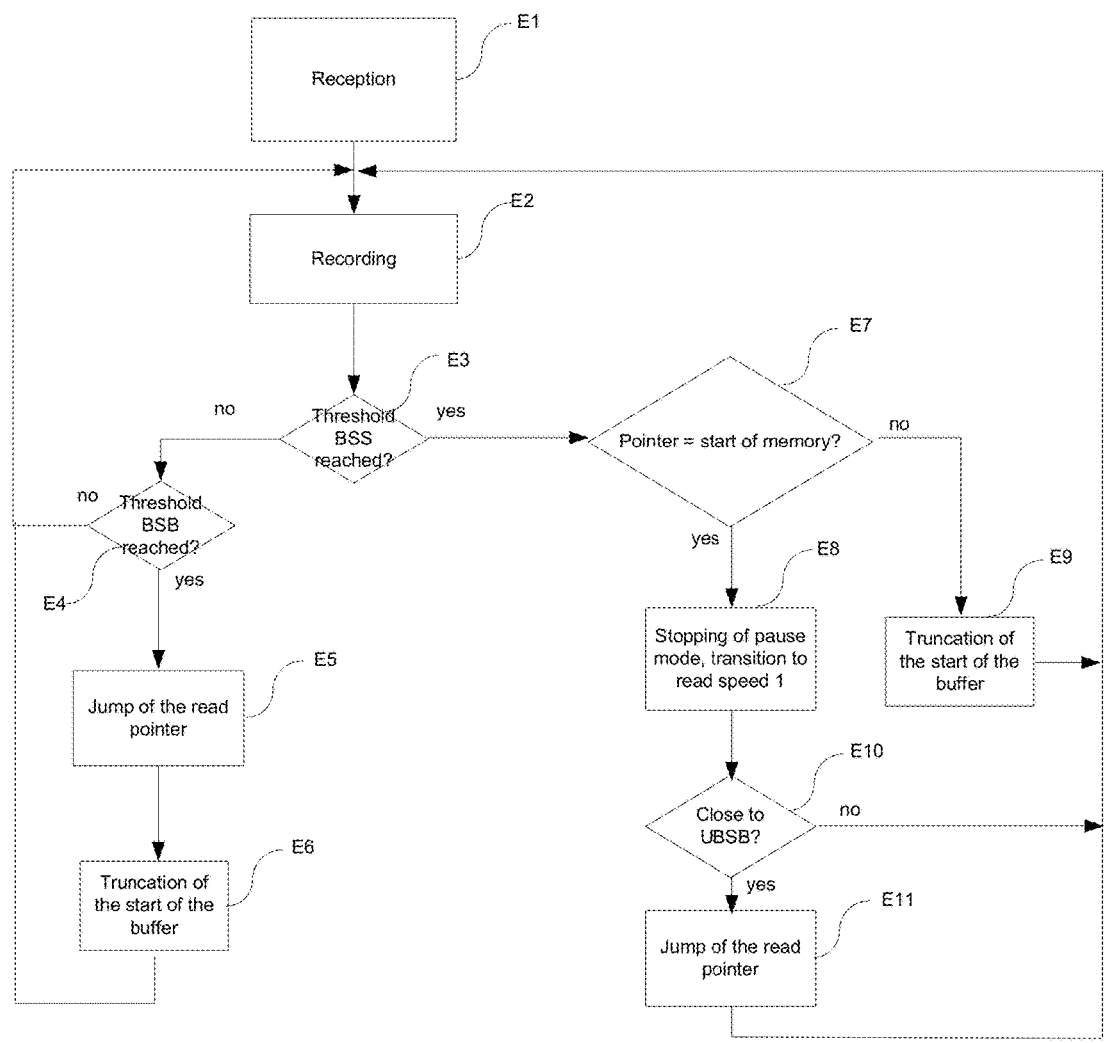

FIG. 3 shows this first embodiment of the first invention.

According to this first embodiment of the invention, during a first step E1, a user switches on his decoder and selects a reception channel using his remote control. The data received are then viewed by the user on a television screen connected to the decoder (note that the decoder can be built into the television set and constitute a single device). The data are also recorded in the timeshift buffer memory 32 as they are received, step E2. Advantageously, the processor 33 manages the filling rate of the timeshift buffer memory 32 in the following way.

As long as the threshold BSS is not reached, step E3, nor the threshold BSB reached, step E4, the data continue to be recorded in the time storage buffer memory. If the threshold BSB is reached while the threshold BSS is not reached, then we move to step E5 which consists in performing a jump with the read pointer of the timeshift buffer memory. The jump (in size or in time) depends on several parameters, on what can be considered as acceptable by a user. It can be assumed that a jump corresponding to a few seconds, 20 to 30 seconds for example, can be a limit considered as acceptable for a user. Step E5 is followed by step E6 during which the start of the timeshift buffer memory is erased in order to be adapted to write other data received, the size UBSB remaining constant. The data erased can be erased at addresses other than the addresses where the new data are written.

Following the step E6, we revert to step E2. During steps E3 to E6, the data are continually received and written to the timeshift buffer memory, the threshold BSB being less than the threshold UBSB.

When the threshold BSS is reached, step E3, and if the read pointer is at the start of the timeshift buffer memory, step E7, then the processor forces the pause mode and the decoder moves to normal speed read mode (speed 1), step E8. Naturally, if the decoder was not in pause mode (or in fast back, or in slow speed such as slow play) but at a speed greater than 1, then it is left at this speed (for example at 2 times or 4 times fast play). Then, if the filling rate is close to the recording limit capacity of the timeshift buffer memory, step E10, then the read pointer performs a jump forward of a few seconds, step E11, as explained above, during step E5. If during step E7, the read pointer is not at the start of the timeshift buffer memory, then the start of the timeshift buffer memory is truncated, step E9. Start is understood to mean a certain number of addresses, depending on the input bitrate or fixed, proportionally to the size of the memory.

Thus, the data can be periodically truncated. The processor keeps the filling rate under the threshold BSS by periodically testing the quantity of data recorded over time.

For the start of the memory, different values can be defined. For example, the start of the memory comprises a percentage of the threshold BSS. If BSS is set to 15 mins, then the start represents the first 5 minutes of the timeshift buffer memory for example.

When the threshold BSB is reached before the threshold BSS, then the start of the data received is truncated in the timeshift buffer memory and a time jump of the playback is performed if the zone truncated contains the read position.

According to this first embodiment, the processor 33 defines the two thresholds BSB and BSS in a predetermined way.

In a predetermined way, the threshold BSB can be set to 90% of the total storage capacity (UBSB) of the timeshift buffer memory, that is to say 900 MB. It can also be set to the maximum storage value, that is to say 1 GB, but in this case there may be overflows of the timeshift buffer memory.

In a predetermined way, the threshold BSS can be set to 15 mins.

According to another aspect of the invention, instead of defining the threshold BSS, it is possible to defined instead a second size threshold BSB2. FIG. 3 is applied in the same way replacing the threshold BSS with the threshold BSB2. The advantage of defining this second threshold in terms of size and not in terms of time is that it enables bitrate variations to be absorbed all the time.

According to a second embodiment, the thresholds, or one of the two thresholds, can be determined dynamically and for example based on data associated with different channels, different examples of which are given hereafter.

FIG. 4 shows a dynamic setting of the parameters of the timeshift buffer memory according to this second embodiment.

During a step S1, a user switches on his decoder and selects a reception channel using his remote control. When the decoder is switched on, the parameters of the timeshift buffer memory BSB and BSS are set to a size defined as minimum. This size is for example 1 GB for BSB and 15 mins for BSS. These so-called minimum sizes can also be set for each decoder or at the factory or by the user or according to the country of use of the decoder or the broadcast network to which the decoder is connected. The data received are then viewed by the user on a television screen connected to the decoder (note that the decoder can be built into the television set and constitute a single device). The data are also recorded in the timeshift buffer memory 32 as they are received, step S2. Step S2 corresponds to steps E1 and E2 in FIG. 3.

During a step S3, the processor 33 analyses the speed at which the timeshift buffer memory is filled in order to analyse the bitrates of the channel received. The average bitrate and accessorily the maximum bitrate are data which enable better setting of the parameters of the timeshift buffer memory. This can be done during the reception of each channel.

The processor 33 observes the bitrate of each channel; it can also observe the bitrate of several channels and take an average over these different channels but in the latter case, the measurement is less reliable than channel by channel. Performing the measurement over a set of channels can be worthwhile if the channels are recognised as quite similar in terms of bitrate. The bitrate can also be an item of data retrieved for example over the internet in the case of IP channels rather than being calculated by the decoder internally. For cable or satellite broadcasts, the bitrate can also be retrieved by the decoder, on an internet site if the decoder can retrieve them or on a site set up by the operator or indicated in a private field of the signalling, or PMT, SDT or NIT service for example.

Preferably, the processor 33 analyses the bitrate of each channel and sets the parameters of the timeshift buffer memory 32 for each channel. The setting of the parameters can be dynamically adjusted when a channel is watched or can be used during the next connection to this channel to set the initial threshold value instead of setting it to a minimum value.

The threshold BSS is thus adjusted according to the average bitrate. However, if the channel has large bitrate variations, it is also worthwhile adjusting the threshold BSS according to the maximum bitrate of the channel.

If it is considered that the bitrate variation on a given network is 50%, the threshold BSS can be calculated thus:

$$BSS=(UBSB-((AvBitRate*1.5)*durationMaxBitRate))/AvBitRate$$

When the threshold depends both on the average bitrate and the maximum bitrate, the threshold BSS can be calculated thus:

$$BSS=(UBSB-(MaxBitRate*durationMaxBitRate))/AvBitRate$$

According to another variant, the threshold BSB representing the capacity limit of the timeshift buffer memory is also set according to the average bitrate.

According to another variant, the threshold BSB is also set according to the average bitrate and the maximum bitrate.

Step E3 described with reference to FIG. 3 thus uses the threshold value defined as indicated above.

Advantageously, a bitrate reduction can further be combined with this embodiment and its variants. In fact, if a bitrate reduction is achieved, then the user can benefit from a greater recording time limit or at least in an identical time, it is possible to put on more data received.

According to a first variant associated with bitrate reduction, a transcoding of the data is performed during the reception of the data.

FIG. 6a shows this variant. During step G1, a user switches on his decoder and selects a reception channel using his remote control. The data received are then viewed by the user on a television screen connected to the decoder. The data are also recorded in the timeshift buffer memory 32 as they are received. Step G1 corresponds to steps E1 and E2 in FIG. 3.

During a step G2, the decoder receives the PMT tables with the data and records them in the memory 31. The PMT tables are recorded in the form of metadata in a database of the memory 31 and are periodically reinjected at playback. They can also be recorded with the data in the timeshift buffer memory but this requires modification of the PMT tables at playback for each repetition. When the timeshift buffer memory reaches a predetermined filling threshold, step G3, the processor 33 decides to transcode the data received in order reduce their bitrate before recording them in the timeshift buffer memory. During a step G4, according to a first variant, the processor 33 modifies the PMT tables received before recording them. The PMT tables are modified to reflect the new format of the data recorded and recorded as metadata associated with a position in the data stream. The processor records as metadata the initial PMT associated with a validity start position and the modified PMT associated with the position of the start of the transcoded data. Likewise, the processor manages the PMT table versions so that during playback, it correctly detects the PMT changes due to the transcoding and the actual PMT changes in the stream.

For example, if the processor transcodes the data between the instants T0+X and T1−Y, then, if the initial stream comprises the following PMTs:

T0 PMT V2 . . . T1 PMT V3 in the stream recorded and decoded we have the following PMTs:

T0 PMT V2 . . . T0+X PMT V3 . . . T1−Y PMT V4 . . . T1 PMY V5

At playback, the PMT table is periodically injected into the stream, for example every 100 ms according to the position. If the processor jumps in the stream, the processor injects the PMT preceding the position reached. Any PMT transition is managed as a new PMT version in the stream.

During playback, a black screen is experienced or the image freezes, due to this transition. In order to limit this transition in which a black screen is experienced or the image freezes, it is also possible, for a short period of time, to record both the initial (untranscoded) data and the low bitrate transcoded data so that at playback it is possible to use two video decoders temporarily and switch from one decoder to the other.

According to a second variant of this step G4, the PMT tables are not modified. For this purpose, the processor uses metadata associated with a position in the stream, the metadata containing all the information necessary to make it possible to substitute the initial data with the low bitrate data. In the same way, it is possible to limit the black screens or the freezing of the image by recording for a few seconds the transcoded and untranscoded data and by generating the metadata reflecting these transitions.

The data are transcoded during a step G5. As long as the timeshift buffer memory contains data greater than a predetermined threshold, the data received are transcoded. This last threshold can be less, moreover, than the threshold which initiates the start of the transcoding.

According to a variant shown in FIG. 6b, step G3 is replaced with a step G3'. The other steps G1, G2, G4, G5 of the method shown in FIG. 6b are identical to steps G1, G2, G4, G5 of the method of FIG. 6a.

During step G3', the processor decides to transcode not according to a filling threshold of the buffer memory but by determining the bitrate of the data received. When the bitrate is greater than a predetermined threshold bitrate, the processor 33 then decides to transcode the data received. Bitrate is understood here to mean either the average bitrate of the data received or a bitrate estimated according to the data received as indicated above. If the data are audio data, their bitrate is less than the SD video data bitrate and the HD video data bitrate.

FIGS. 6a and 6b relate to the transcoding of data. When such a transcoding is used as described above, step G5 is then followed by step E3 described with reference to FIG. 3. The main advantage of the transcoding being that the threshold BSS is reached less quickly than when the data are not transcoded. The disadvantage naturally being the reduction in the resolution or in the quality of the data recorded in the timeshift buffer memory.

Figure 7A:
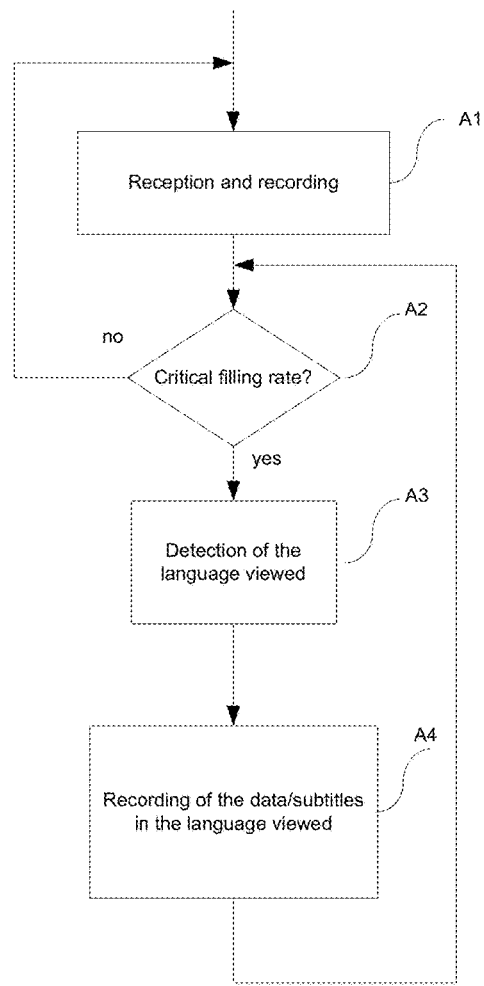
Figure 7B:
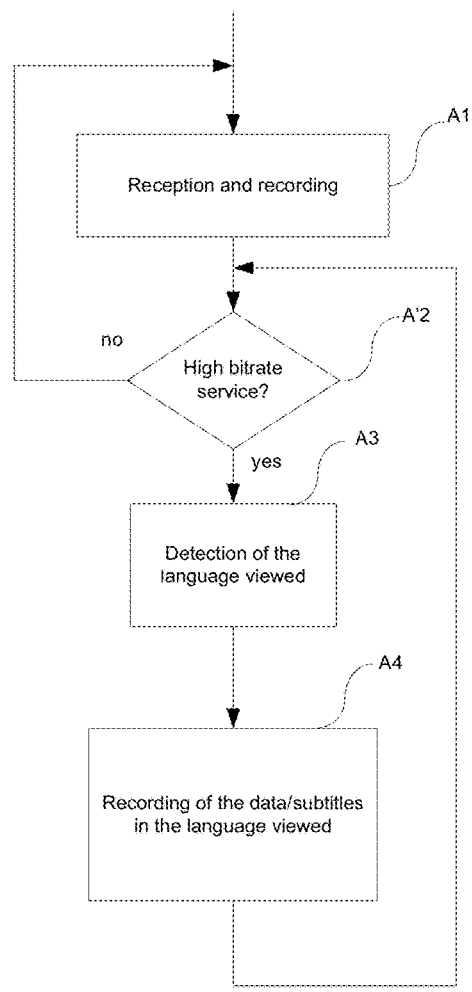

According to a second variant associated with bitrate reduction, a bitrate reduction can be applied by recording only certain parts of the data. FIGS. 7a and 7b show such a variant.

Actually, when the data received are audiovisual data and subtitles, the data are sometimes received in different audio languages also with several subtitle choices. However, the user rarely changes the language listened to during a programme, nor the subtitling. It is therefore possible to reduce the data recorded in the timeshift buffer memory by recording only the data in the audio language selected and the subtitles chosen. This is also valid in the case of multiple videos.

During a step A1, the data are received by the decoder 3 and recorded in the timeshift buffer memory. When the timeshift buffer memory 32 reaches a predetermined filling threshold, in time, step A2, the processor detects the language decoded and the subtitles viewed, step A3. During a step A4, the processor then records only the audio data and the subtitles being viewed and listened to.

In order to reflect the data as recorded, that is to say modified, the PMT tables are modified during recording of the modified data to which they refer.

According to a variant shown in FIG. 7b, step A2 is replaced with a step A'2. The other steps A1, A3, A4 of the method shown in FIG. 7b are identical to steps A1, A3, A4 of the method of FIG. 7a.

During step A'2, the processor decides not to record all the audiovisual and subtitle data streams corresponding to the different languages not according to a filling threshold of the buffer memory but by determining the bitrate of the data received. When the bitrate is greater than a predetermined threshold bitrate, the processor 33 then decides to record only the data in the audio language selected and the subtitles chosen. Bitrate is understood here to mean either the average bitrate of the data received or a bitrate estimated according to the data received as indicated above. If the data are audio data, their bitrate is less than the SD video data bitrate and the HD video data bitrate.

According to a variant of these FIGS. 7a and 7b, it is also possible to decide to record only the data viewed and listened to without even doing the test of step A2. As soon as the data are decoded by the processor 33 in order to be viewed and listened to (by a user who has selected the language and the subtitles which he wishes to view), the processor can decide to record only the data corresponding to the choice of the user.

FIGS. 7a and 7b relate to a partial recording of the data. When such a transcoding is used as described above, step A4 is then followed by step E3 described with reference to FIG.

3. The main advantage being that the threshold BSS is reached less quickly than when the data are not transcoded.

According to a third variant associated with bitrate reduction, the processor 33 records only a part of the groups of data received. When the data are compliant with MPEG coding standards, for example MPEG-2 or MPEG-4 coding standards, the data are coded in the form of groups of images known by the acronym GOP (group of pictures).

Figure 8A:
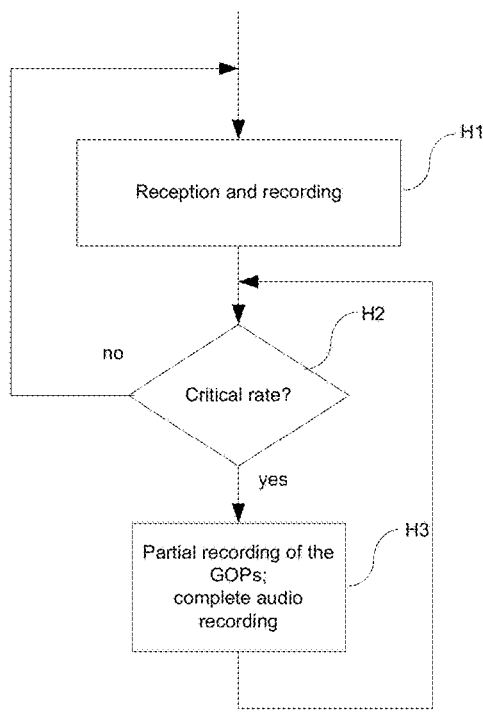
Figure 8B:
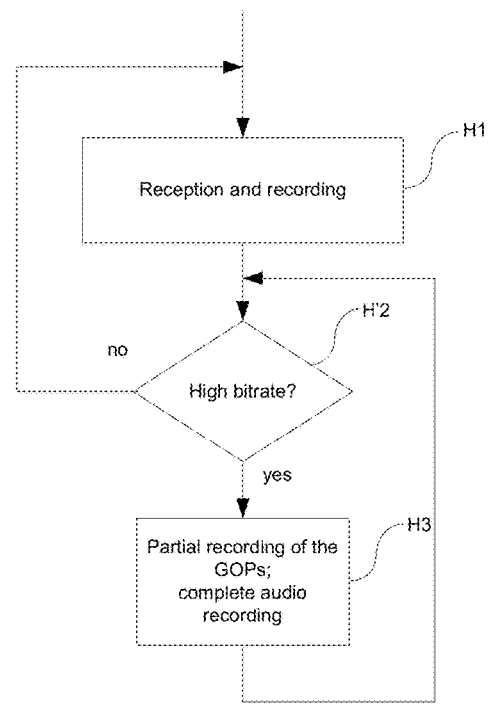

FIGS. 8*a* and 8*b* show this embodiment.

During a step H1, the data are received by the decoder 3 and recorded in the timeshift buffer memory. Step H1 corresponds to steps E1 and E2 in FIG. 3. When the timeshift buffer memory 32 reaches a predetermined filling threshold, in time, step H2, the processor decides to record only a percentage of the groups of data (GOPs) received, step H3.

The percentage of GOPs recorded varies according to the bitrate of the data received. If the bitrate is considered a high bitrate, for example when HD data are received, then a high percentage of the GOPs is not recorded. For example, 3 out of 4 GOPs received are recorded. The GOPs are delimited by indexing images of intra (I) type or images of IDR type for data compliant with the MPEG4 coding standard. However, in order to have a correct sound, all the audio data are recorded. Thus, on reading of the time storage buffer memory, the video data vary slowly (there are freezes of the image for the missing GOPs) but the sound and the subtitles are fully restituted.

According to a variant shown in FIG. 8*b*, step H2 is replaced with a step H2'. The other steps H1, H3 of the method shown in FIG. 8*b* are identical to steps H1, H3 of the method of FIG. 8*a*.

During step H'2, the processor decides to not record all the GOPs not according to a filling threshold of the buffer memory but by determining the bitrate of the data received. When the bitrate is greater than a predetermined threshold bitrate, the processor 33 decides to record only a percentage of the GOPs. Bitrate is understood here to mean either the average bitrate of the data received or a bitrate estimated according to the data received as indicated above. If the data are audio data, their bitrate is less than the SD video data bitrate and the HD video data bitrate. This variant causes a significant degradation of the data and is less relevant than the variant described with reference to FIG. 8*a*.

According to a variant of these FIGS. 8*a* and 8*b*, it is also possible to decide to record only a percentage of the GOPs without even doing the test of step H2. As soon as the data are decoded by the processor 33 in order to be viewed and listened to, the processor can decide to record only a percentage of the GOPs according to the bitrate of the data received. However, this variant causes a significant degradation of all the data.

FIGS. 8*a* and 8*b* relate to a partial recording of the data. When such a bitrate reduction is used, step H4 is then followed by step E3 described with reference to FIG. 3. The main advantage being that the threshold BSS is reached less quickly than when the data are recorded in their entirety.

According to a fourth variant associated with bitrate reduction, the processor 33 combines a bitrate reduction associated with transcoding with a bitrate reduction associated with a recording of the data selected by the user (language and subtitling). Thus, initially, the processor 33 applies a bitrate reduction by transcoding the data received according to the steps described in FIG. 6*a* or 6*b*.

Following step G5 of FIG. 6*a* or 6*b*, steps A3 and A4 of FIG. 7*a* or 7*b* are performed and thus the stream is transcoded then only the data corresponding to the audio language selected and to the subtitling chosen are recorded in the timeshift buffer memory.

When such a combined bitrate reduction is used, step A4 is then followed by step E3 described with reference to FIG. 3. The main advantage being that the threshold BSS is reached less quickly than when the data are recorded in their entirety.

According to a fifth variant associated with bitrate reduction, the processor 33 combines a bitrate reduction associated with transcoding with a bitrate reduction associated with a partial recording of the GOPs. Thus, initially, the processor 33 applies a bitrate reduction by transcoding the data received according to the steps described in FIG. 6*a* or 6*b*.

Following step G5 of FIG. 6*a* or 6*b*, step H3 of FIG. 8*a* or 8*b* is performed and thus the stream is transcoded then only certain GOPs are recorded in the timeshift buffer memory.

When such a combined bitrate reduction is used, step H3 is then followed by step E3 described with reference to FIG. 3. The main advantage being that the threshold BSS is reached less quickly than when the data are recorded in their entirety.

According to a sixth variant associated with bitrate reduction, the processor 33 combines a bitrate reduction associated with recording data (languages and subtitlings) selected by the user with a bitrate reduction associated with a partial recording of the GOPs. Thus, initially, the processor 33 applies a bitrate reduction by making a selection of the data actually selected by the user and by not recording in the timeshift buffer memory the audio data and the subtitlings not used according to the steps described in FIG. 7*a* or 7*b*.

Following step A3 of FIG. 7*a* or 7*b*, step H3 of FIG. 8*a* or 8*b* is performed and thus the bitrate of the stream is doubly reduced.

When such a combined bitrate reduction is used, step H3 is then followed by step E3 described with reference to FIG. 3. The main advantage being that the threshold BSS is reached less quickly than when the data are recorded in their entirety.

According to a seventh variant associated with bitrate reduction, the processor 33 combines a bitrate reduction associated with transcoding with a bitrate reduction associated with recording the streams actually used and with a recording of a percentage of the GOPs. Thus, initially, the processor 33 applies a bitrate reduction by transcoding the data received according to the steps described in FIG. 6*a* or 6*b*.

Then, the processor 33 applies a bitrate reduction by recording only the data actually used, in terms of language and in terms of subtitling according to the steps described in FIG. 7*a* or 7*b*. Then the processor 33 performs a third bitrate reduction by recording only a percentage of the GOPs according to the steps described in FIGS. 8*a* and 8*b*.

When such a combined bitrate reduction is used, step H3 is then followed by step E3 described with reference to FIG. 3. The main advantage being that the threshold BSS is reached less quickly than when the data are recorded in their entirety.

According to a third embodiment, the thresholds BSS and BSB or one of the two are dynamically defined according to the type of data transmitted by the channel.

This third embodiment is described with reference to FIG. 5.

During a step F1, a user switches on his decoder and selects a reception channel using his remote control. When the decoder is switched on, the parameters of the timeshift buffer memory, BSB and BSS, are set to a size defined as minimum. This size is for example 1 GB for BSB and 15 mins for BSS. These so-called minimum sizes can also be set for each decoder or at the factory or by the user or according to the country of use of the decoder. The data received are then viewed by the user on a television screen connected to the decoder (note that the decoder can be built into the television set and constitute a single device). The data are also recorded in the timeshift buffer memory 32 as they are received.

During a step F2, the processor 33 determines the type of stream received. The stream can be determined by analysing the fields present in the data. When the stream received is of MPEG (Motion Picture Expert Group) type, the PMT tables present in the stream make it possible to determine the type of data contained in the stream.

Types of stream is understood to mean, for example but in a non-restrictive way, an audio stream, an HD (high definition) video stream, and an SD (standard definition) video stream. For each type of data, the maximum bitrate is known.

During a step F3, a comparison is made with the stream previously received, if the user has just changed channel. If the stream in not of the same type as the previous one, the processor then adjusts during a step F4 the parameters of the timeshift buffer memory 32. Step F3 is optional; it is possible not to make a comparison with the previous stream and to adjust the thresholds each time that the user changes channel.

Among the parameters to be adjusted is the recording time limit BSS, if the capacity limit is fixed.

If the type of data (or the type of channel) is chosen from among
- audio (a radio service for example),
- HD video (an HD TV service for example),
- SD video (an SD TV service for example), An HD audio service and an SD audio service can also be envisaged.

If the data are audio data, then the two thresholds are set with the following thresholds:
BSS=BSS_aud
BSB=BSB_aud If the data are HD video data, then the two thresholds are set with the following thresholds:
BSS=BSS_HD
BSB=BSB_HD If the data are SD video data, then the two thresholds are set with the following thresholds:
BSS=BSS_SD
BSB=BSB_SD Among the parameters, the recording capacity limit UBSB can also be adjusted, if the time limit is fixed.

The thresholds thus defined are used during step E3 with reference to FIG. 3.

In order to improve this third embodiment, it is possible according to a first variant to reduce the bitrate of the data recorded.

For this purpose, it is possible to perform a transcoding of the data received prior to their recording. For this purpose, steps G1 to G5 featuring in FIGS. 6a and 6b and described above are carried out prior to step E3 described with reference to FIG. 3.

In order to improve this third embodiment, according to a second variant associated with bitrate reduction, a bitrate reduction can be applied by recording only certain parts of the data.

It is possible to reduce the data recorded in the timeshift buffer memory by recording only the audio data listened to and viewed.

For this purpose, steps A1 to A4 featuring in FIGS. 7a and 7b and described above are carried out prior to step E3 described with reference to FIG. 3.

According to a third variant associated with bitrate reduction, the processor 33 records only a part of the groups of data received. When the data are compliant with MPEG coding standards, for example MPEG-2 or MPEG-4 coding standards, the data are coded in the form of groups of images known by the acronym GOP (group of pictures).

For this purpose, steps H1 to H3 featuring in FIGS. 8a and 8b and described above are carried out prior to step E3 described with reference to FIG. 3.

According to a fourth variant associated with bitrate reduction, the processor 33 combines a bitrate reduction associated with transcoding with a bitrate reduction associated with a recording of the data selected by the user (language and subtitling). Thus, initially, the processor 33 applies a bitrate reduction by transcoding the data received according to the steps described in FIG. 6a or 6b.

Following step G5 of FIG. 6a or 6b, steps A3 and A4 of FIG. 7a or 7b are performed and thus the stream is transcoded then only the data corresponding to the language listened to and to the subtitlings viewed are recorded in the timeshift buffer memory.

When such a combined bitrate reduction is used, step A4 is then followed by step E3 described with reference to FIG. 3. The main advantage being that the threshold BSS is reached less quickly than when the data are recorded in their entirety.

According to a fifth variant associated with bitrate reduction, the processor 33 combines a bitrate reduction associated with transcoding with a bitrate reduction associated with a partial recording of the GOPs. Thus, initially, the processor 33 applies a bitrate reduction by transcoding the data received according to the steps described in FIG. 6a or 6b.

Following step G5 of FIG. 6a or 6b, step H3 of FIG. 8a or 8b is performed and thus the stream is transcoded then certain GOPs are recorded in the timeshift buffer memory.

When such a combined bitrate reduction is used, step H3 is then followed by step E3 described with reference to FIG. 3. The main advantage being that the threshold BSS is reached less quickly than when the data are recorded in their entirety.

According to a sixth variant associated with bitrate reduction, the processor 33 combines a bitrate reduction associated with recording data (languages and subtitlings) selected by the user with a bitrate reduction associated with a partial recording of the GOPs. Thus, initially, the processor 33 applies a bitrate reduction by making a selection of the data actually selected by the user and by not recording in the timeshift buffer memory the audio data and the subtitlings not used according to the steps described in FIG. 7a or 7b.

Following step A3 of FIG. 7a or 7b, step H3 of FIG. 8a or 8b is performed and thus the bitrate of the stream is doubly reduced.

When such a combined bitrate reduction is used, step H3 is then followed by step E3 described with reference to FIG. 3. The main advantage being that the threshold BSS is reached less quickly than when the data are recorded in their entirety.

According to a seventh variant associated with bitrate reduction, the processor 33 combines a bitrate reduction associated with transcoding with a bitrate reduction associated with recording the streams actually used and with a recording of a percentage of the GOPs. Thus, initially, the processor 33 applies a bitrate reduction by transcoding the data received according to the steps described in FIG. 6a or 6b.

Then, the processor 33 applies a bitrate reduction by recording only the data actually used, in terms of language and in terms of subtitling according to the steps described in FIG. 7a or 7b. Then the processor 33 performs a third bitrate reduction by recording only a percentage of the GOPs according to the steps described in FIGS. 8a and 8b.

When such a combined bitrate reduction is used, step H3 is then followed by step E3 described with reference to FIG. 3. The main advantage being that the threshold BSS is reached less quickly than when the data are recorded in their entirety.

We will now describe the specific features of the second invention.

According to this invention, the processor comprises:
Means for defining a first threshold defining a capacity limit of the timeshift buffer memory and
means for defining a second threshold defining a time limit for recording in the timeshift buffer memory and
means for defining a third threshold defining a minimum time limit for recording in the timeshift buffer memory
the processor records the data in the timeshift buffer memory as long as at least one of the first threshold or the second threshold is not reached and when at least one of the two thresholds is reached:
if the third threshold is also reached, then
 if the read pointer of the processor is in a zone of the timeshift buffer memory wherein the processor must truncate data, the processor moves to the mode for normal reading of the timeshift buffer memory if the pause mode was activated or if the read speed was less than the normal read speed, and
 if the read pointer of the processor is not in a zone of the timeshift buffer memory wherein the processor must truncate data, then the processor truncates data in the timeshift buffer memory.

Figure 9:
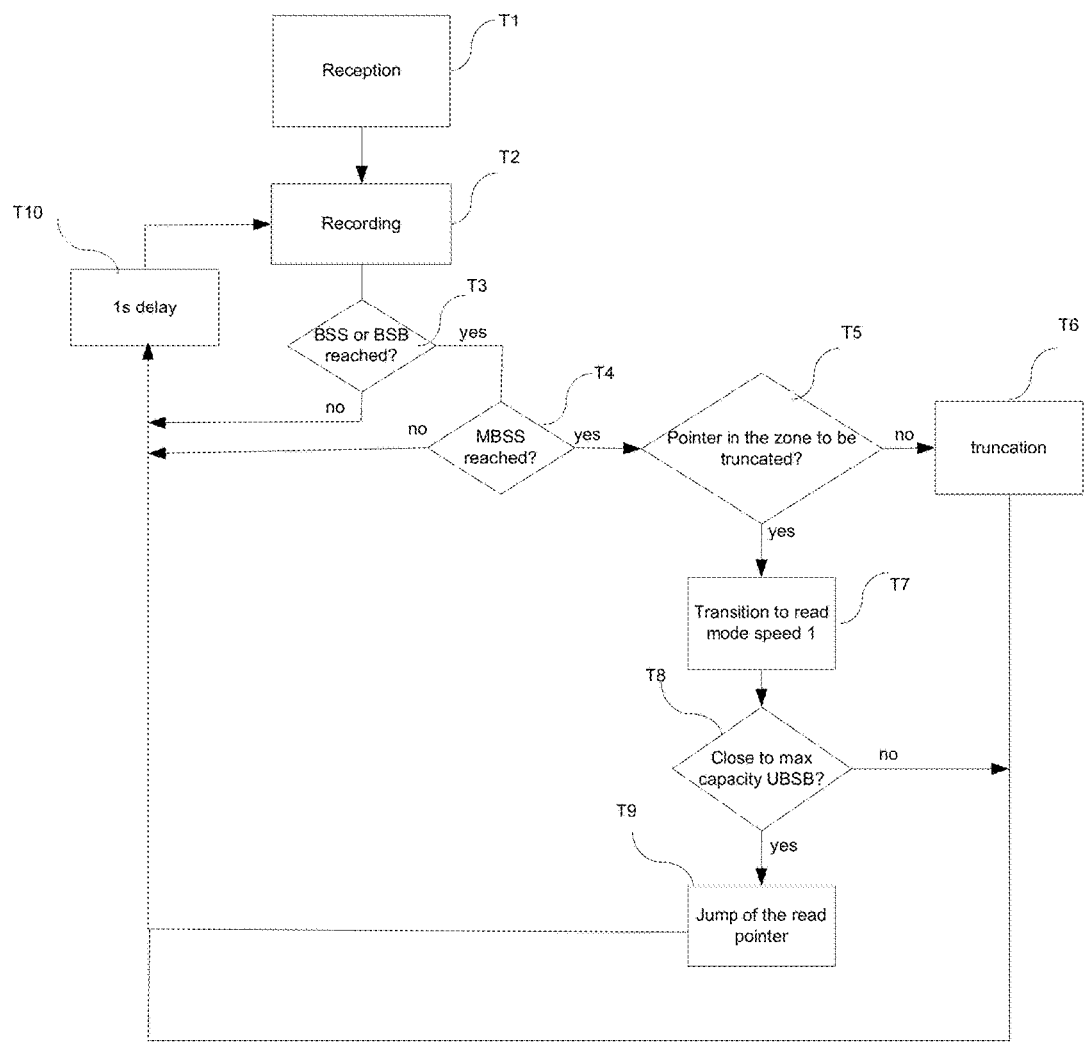
FIG. 9 shows a preferred embodiment of the second invention.

FIG. 9 shows a preferred embodiment of this second invention.

According to this first embodiment, the data start to be received during a step T1 by the decoder. Step T1 marks the start of the reception of the data on a channel, therefore for example the changing of channel, but the data continue to be received throughout the following steps.

The data are recorded during the course of their reception in the timeshift buffer memory, step T2. Then, during a step T3, a test is carried out on the filling rate of the buffer memory. If one of the two thresholds BSB or BSS is reached, then if MBSS is also reached, step T4, and if the read pointer is in the zone to be truncated, step T5, the decoder stops the pause mode and moves to reading the data at speed 1, step T7. Naturally, if the decoder was not in pause mode (or in fast back, or in slow speed such as slow play) but at a speed greater than 1, then it is left at this speed (for example at 2 times or 4 times fast play).

Then, a test is carried out, during a step T8, to see if the filling rate of the buffer memory is close to the maximum capacity UBSB. If this is the case, then the read pointer jumps forward, step T9, and the data comprised between the current value of the read pointer and the new value of the read pointer are therefore not read. The user sees a jump in the image, and this jump must be minimised to avoid visual disturbances for users. Thanks to the invention, such jumps occur infrequently. The length of the jump can depend on the bitrate of the data, on the capacity UBSB, on the position of the read pointer. The length of the jump can be measured in terms of size or advantageously in terms of time, for example 10 to 20 seconds.

If during step T8, the decoder is not close to the maximum capacity reached, then we revert to step T2, that is to say that we continue to receive the data while regularly testing the thresholds BSB and BSS, this by delaying if necessary, step T10 being optional.

If during step T5, the read pointer is not in the zone to be truncated, then we move to step T6 and the start of the timeshift buffer memory is truncated. The size of the truncation also depends on the bitrate, on the position of the read pointer, on the capacity UBSB . . . . Following step T6, we revert to step T2, by delaying if necessary, step T10, before testing the thresholds BSS or BSB again.

Figure 10:
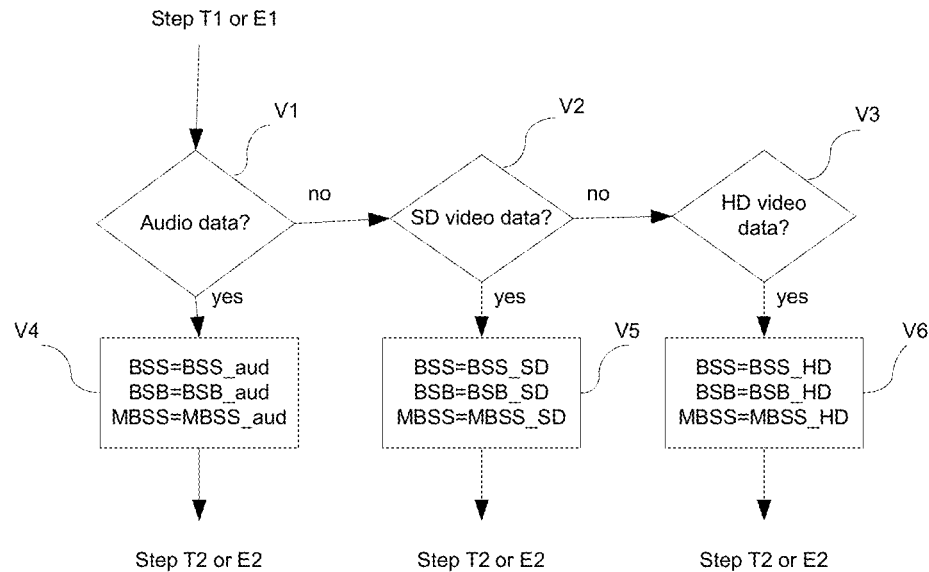
FIGS. 10 and 11 show variant embodiments of the inventions.
Figure 11:
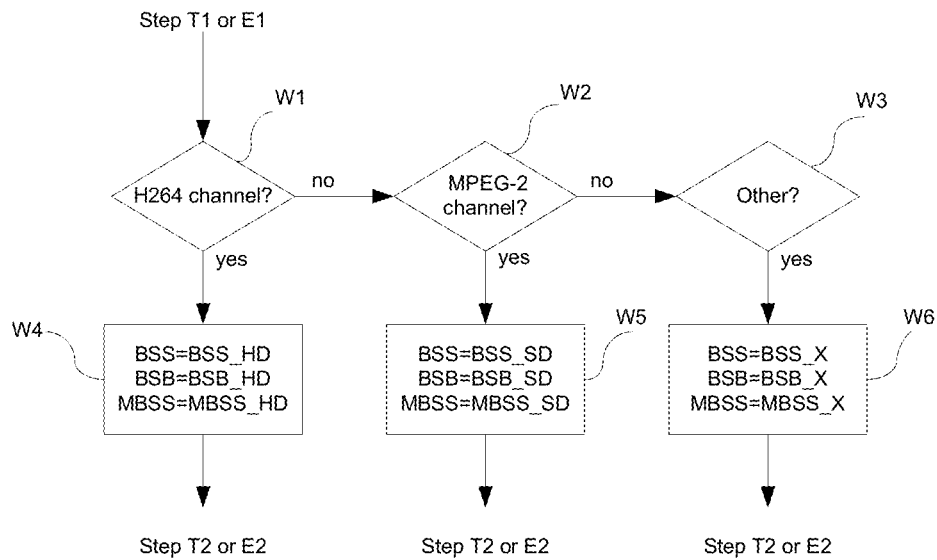

FIGS. 10 and 11 describe a first variant of the embodiment described in FIG. 9.

In these two variants, intermediary steps between steps T1 and T2 of FIG. 9 make it possible to set the three thresholds BSS, BSB and MBSS according to the type of data received.

FIG. 10 shows this variant wherein the type of data (or the type of channel) is chosen from among
audio (a radio service for example),
HD video (an HD TV service for example),
SD video (an SD TV service for example),
An HD audio service and an SD audio service can also be envisaged.

During a test V1 comprised between steps T1 and T2, that is to say during the reception of the data, following a change of channel, the processor 33 determines the type of data received. This type can be determined for example by reading the header or metadata field. In the case of data coded in MPEG-2 or MPEG-4 format, the PMT tables make it possible to detect such a type of data. If the data are audio data, then the three thresholds are set with the following thresholds during a step V4:
BSS=BSS_aud
BSB=BSB_aud
MBSS=MBSS_aud The audio data bitrate is low compared to the video data bitrate, whether SD or HD.

If the data are not audio data, then during a step V2, the processor tests whether the data are SD video data. If the data are SD video data, then the three thresholds are set with the following thresholds during a step V5:
BSS=BSS_SD
BSB=BSB_SD
MBSS=MBSS_SD If the data are not SD video data, then during a step V3, the processor tests whether the data are HD video data. If the data are HD video data, then the three thresholds are set with the following thresholds during a step V6:
BSS=BSS_HD
BSB=BSB_HD
MBSS=MBSS_HD Following the setting of the thresholds, we then move to step T2.

FIG. 11 again shows this variant relating to the type of data but the determination of the type of data is not based on audio, SD video, HD video type but on the type of coding used for coding the data.

During a test W1 comprised between steps T1 and T2, that is to say during the reception of the data, following a change of channel, the processor 33 determines the type of data received. This type can be determined for example by reading the header or metadata field. In the case of data coded in MPEG-2 or MPEG-4 (H264) format, the PMT tables make it possible to detect such a type of data. If the data are H264 data, then the three thresholds are set with the following thresholds during a step V4:
  BSS=BSS_HD
  BSB=BSB_HD
  MBSS=MBSS_HD If the data are not H264 data, then during a test W2, the processor checks whether the data are MPEG-2 data. If the data are MPEG-2 data, then the three thresholds are set with the following values during a step W5:
  BSS=BSS_SD
  BSB=BSB_SD
  MBSS=MBSS_SD If the data are not MPEG-2 data, following the test of step W2, then the data are for example audio data but can also be data of another type. During a step W6, the three thresholds are set with the following values:
  BSS=BSS_X
  BSB=BSB_X
  MBSS=MBSS_X Following steps W4, W5 or W6, the processor moves to step T2.

Naturally, the type of coding is not limited to MPEG-2 or H264 type but can be any other type of coding of the data, even a coding other than a video coding.

Figure 12:
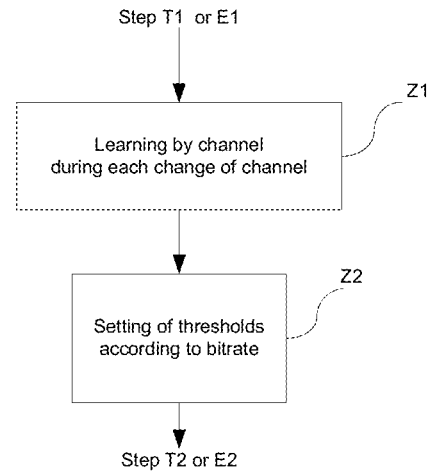
FIG. 12 shows a third variant of the invention.

FIG. 12 shows a second variant of the preferred embodiment. In this second variant, intermediary steps between steps T1 and T2 of FIG. 9 make it possible to set the three thresholds BSS, BSB and MBSS according to the bitrate of the data received.

During a step Z1, following step T1, the processor determines the average bitrate of the data received. It analyses the speed at which the timeshift buffer memory is filled in order to analyse the bitrates of the channel received. The average bitrate and accessorily the maximum bitrate are data which enable better setting of the parameters of the timeshift buffer memory. This can be done during the reception of each channel. The maximum bitrate is not learned only at the moment of the current zapping but also by accumulation of the bitrates calculated during the previous changes of channel on this same service.

The processor 33 observes the bitrate of each channel; it can also observe the bitrate of several channels and take an average over these different channels but in the latter case, the measurement is less reliable than channel by channel. Performing the measurement over a set of channels can be worthwhile if the channels are recognised as quite similar in terms of bitrate. The bitrate can also be an item of data retrieved for example over the internet in the case of IP channels rather than being calculated by the decoder internally. For cable or satellite broadcasts, the bitrate can also be retrieved by the decoder, on an internet site if the decoder can retrieve them or on a site set up by the operator or indicated in a private field of the signalling, or PMT, SDT or NIT service for example.

The different thresholds BSS, BSB, MBSS are calculated according to the threshold during a step Z2.

Preferably, the processor 33 analyses the bitrate of each channel and sets the parameters of the timeshift buffer memory 32 for each channel. The setting of the parameters can be dynamically adjusted when a channel is watched or can be used during the next connection to this channel.

If it is considered that the bitrate variation on a given network is 50%, the threshold BSS can be calculated thus:

$$BSS=(UBSB-((AvBitRate*1.5)*durationMaxBitRate))/AvBitRate,$$

where AvBitRate is the average bitrate, MaxBitRate is the maximum bitrate and durationMaxBitRate is the duration during which the maximum bitrate can be withstood without saturation (overflow of the buffer) when maximum bitrate conditions occur starting from an average bitrate.

When the threshold depends both on the average bitrate and the maximum bitrate, the threshold BSS can be calculated thus:

$$BSS=(UBSB-(MaxBitRate*durationMaxBitRate))/AvBitRate$$

Figures 13A, 13B:
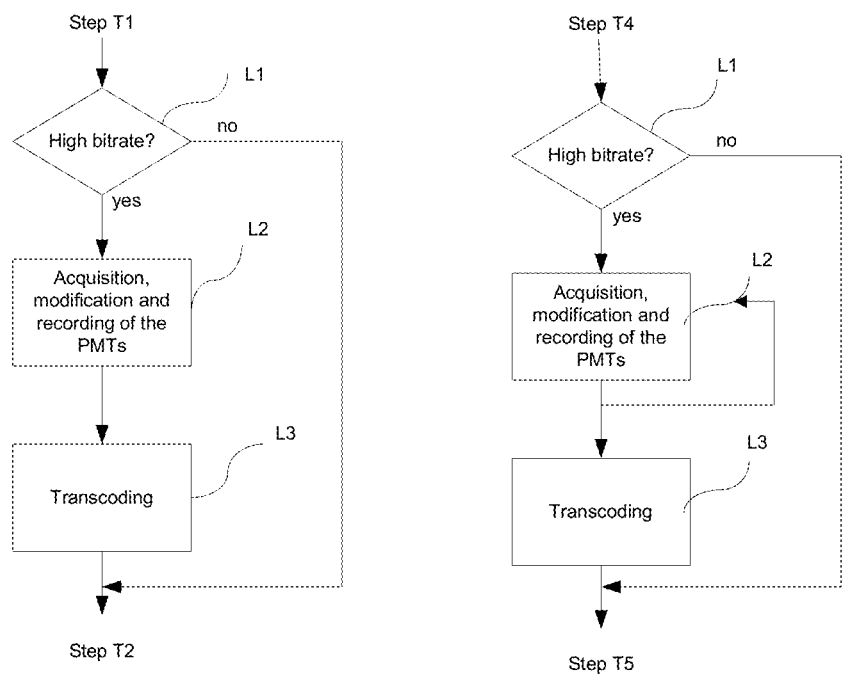
FIGS. 13a and 13b show a fourth variant of the invention.

FIGS. 13a and 13b show a fourth variant of the invention wherein a bitrate reduction is applied to the data received by the decoder.

The steps of FIGS. 13a and 13b are identical.

FIG. 13a shows a bitrate reduction made upstream of the method shown by FIG. 3 relating to a bitrate reduction by transcoding the data.

Following the start of reception of the data, step T1 of FIG. 9, the bitrate of the data is evaluated, step L1, for example with reference to FIG. 4, 5 or 6 described above or by use of data retrieved from the network (metadata or other data). High bitrate may be understood to mean for example the bitrate of data coded in HD. Low bitrate may be understood to mean the bitrate of audio data. For SD data, a threshold can be set below which the bitrate is considered to be low.

If the bitrate is considered to be high, then the PMT tables included in the stream are modified and recorded.

The PMT tables are recorded in the form of metadata in a database of the memory 31 and are periodically reinjected at playback. They can also be recorded with the data in the timeshift buffer memory but this requires modification of the PMT tables at playback for each repetition. The processor 33 then modifies the PMT tables received before recording them. The PMT tables are modified to reflect the new format of the data recorded and recorded as metadata associated with a position in the data stream. The processor 33 records as metadata the initial PMT associated with a validity start position and the modified PMT associated with the position of the start of the transcoded data. Likewise, the processor 33 manages the PMT table versions so that during playback, it correctly detects the PMT changes due to the transcoding and the actual PMT changes in the stream.

For example, if the processor 33 transcodes the data between the instants T0+X and T1−Y, then, if the initial stream comprises the following PMTs:
T0 PMT V2 . . . T1 PMT V3
in the stream recorded and decoded we have the following PMTs:
TO PMT V2 . . . T0+X PMT V3 . . . T1−Y PMT V4 . . . T1 PMY V5

At playback, the PMT table is periodically injected into the stream, for example every 100 ms according to position. If the processor jumps in the stream, the processor injects the PMT preceding the position reached. Any PMT transition is managed as a new PMT version in the stream.

During playback, a black screen is experienced or the image freezes, due to this transition. In order to limit this transition in which a black screen is experienced or the image freezes, it is also possible, for a short period of time, to record both the initial (untranscoded) data and the low bitrate transcoded data so that at playback it is possible to use two video decoders temporarily and switch from one decoder to the other.

According to a variant of this step, the PMT tables are not modified. For this purpose, the processor 33 uses metadata associated with a position in the stream, the metadata containing all the information necessary to make it possible to substitute the initial data with the low bitrate data. In the same way, it is possible to limit the black screens or the freezing of the image by recording for a few seconds the transcoded and untranscoded data and by generating the metadata reflecting these transitions.

The data are transcoded during a step L3 before being recorded in the timeshift buffer memory during step T2 described above.

FIG. 13b shows the transcoding as FIG. 13a does but when the transcoding is positioned not immediately during the change of channel but between steps T4 and T5. The steps being identical to those of FIG. 13a, they are not described again here.

According to a variant of FIGS. 13a and 13b, step L1 is optional and the transcoding can be performed all the time, without bitrate condition.

Figure 14A:
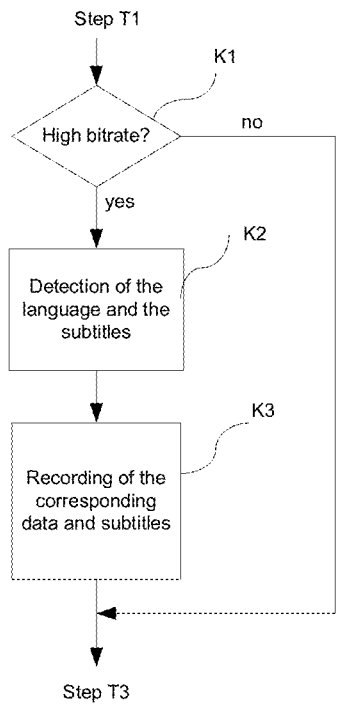
FIGS. 14a and 14b show a fifth variant of the invention.
Figure 14B:
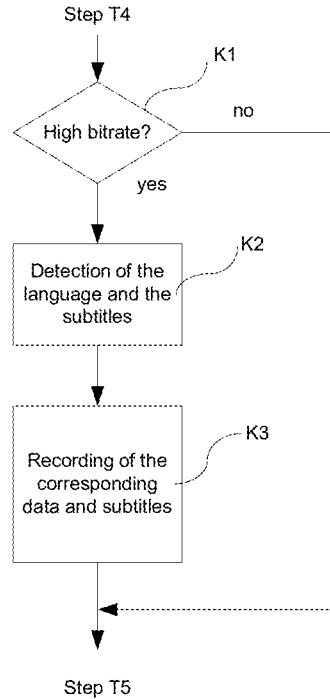

FIGS. 14a and 14b describe a fifth variant of the invention wherein a bitrate reduction is also applied to the data received but according to this bitrate reduction, a partial recording of the data is carried out.

When the data received are audiovisual data and subtitles, the data are sometimes received in different audio languages also with several subtitle choices. However, the user rarely changes the language listened to during a programme, nor the subtitling. It is therefore possible to reduce the data recorded in the timeshift buffer memory by recording only the audio data listened to and viewed. This is also valid in the case of multiple videos.

When the data are considered to be high bitrate, as described with reference to step L1 above (step K1 is identical to step L1), during a step K2, the processor 33 detects the audio language selected by the user and detects the subtitles viewed. During a step K3, the processor 33 records in the timeshift buffer memory only the data received whose language corresponds to that selected and the subtitles chosen by the user.

In order to reflect the data as recorded, that is to say modified, the PMT tables are modified during recording of the modified data to which they refer.

FIG. 14b shows the bitrate reduction as made in FIG. 8a but positioned not immediately during the change of channel but between steps T4 and T5. The steps being identical to those of FIG. 14a, they are not described again here.

According to a variant of FIGS. 14a and 14b, step K1 is optional and the bitrate reduction can be performed all the time, without bitrate condition.

Figure 15A:
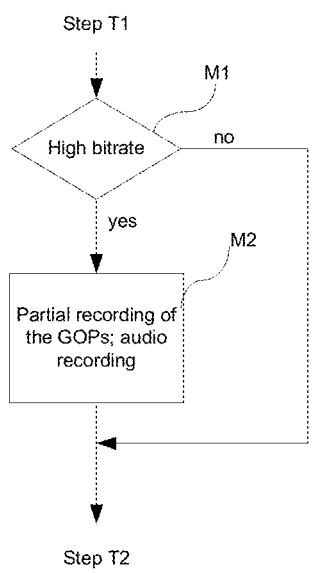
FIGS. 15a and 15b show a sixth variant of the invention.
Figure 15B:
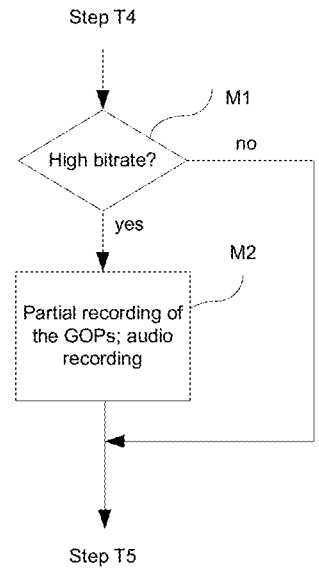

FIGS. 15a and 15b describe a sixth variant of the invention wherein a bitrate reduction is also applied to the data received but according to this bitrate reduction, only a percentage of the GOPs is recorded.

When the data are considered to be high bitrate, as described with reference to step L1 above (step M1 is identical to step L1), during a step M2, the processor 33 decides to record only a percentage of the video GOPs received.

The percentage of GOPs recorded varies according to the bitrate of the data received. For example, 3 out of 4 GOPs received are recorded. The GOPs are delimited by indexing images of intra (I) type or images of IDR type for data compliant with the MPEG4 coding standard. However, in order to have a correct sound, all the audio data are recorded. Thus, on reading of the time storage buffer memory, the video data vary slowly (there are freezes of the image for the missing GOPs) but the sound and the subtitles are fully restituted.

FIG. 15b shows bitrate reduction by partial recording of the GOPs as FIG. 15a does but when the bitrate reduction is positioned not immediately during the change of channel but between steps T4 and T5. The steps being identical to those of FIG. 15a, they are not described again here.

According to a variant of FIGS. 15a and 15b, step M1 is optional and the recording of a percentage of the GOPs can be performed all the time, without bitrate condition.

According to the bitrate observed, it is also possible to combine the bitrate reductions with each other, by combining one, two or three bitrate reductions simultaneously as described above.

We will now describe the specific features of the third invention.

The method according to the third invention consists in performing steps F1 to F4 of FIG. 5 described above.

According to a preferred embodiment, this third invention relates to a method for receiving and recording data on a recording medium, the device comprising a processor for implementing a timeshift function in a part of said recording medium called timeshift buffer memory. According to the invention, the device comprises:

means for detecting a type of data received, and means for adjusting a time limit for recording in the timeshift buffer memory according to said type of data received.

Advantageously, according to a first variant associated with bitrate reduction, a transcoding of the data is performed during the reception of the data.

FIGS. 6a and 6b described above show this variant. Steps G4 and G5 can be performed before or after step F2.

Advantageously, according to a second variant associated with bitrate reduction, a bitrate reduction can be applied by recording only certain parts of the data. FIGS. 7a and 7b described above show such a variant. Steps A3 and A4 can be performed before or after step F2.

Advantageously, according to a third variant associated with bitrate reduction, the processor 33 records only a part of the groups of data received. When the data are compliant with MPEG coding standards, for example MPEG-2 or MPEG-4 coding standards, the data are coded in the form of groups of images known by the acronym GOP (group of pictures).

FIGS. 8a and 8b described above show this embodiment. Step H3 can be performed before or after step F2.

FIG. 3 described above also shows a particular embodiment of this invention.

FIG. 9 described above also shows a particular embodiment of this invention.

We will now describe the specific features of the fourth invention.

Figure 16:
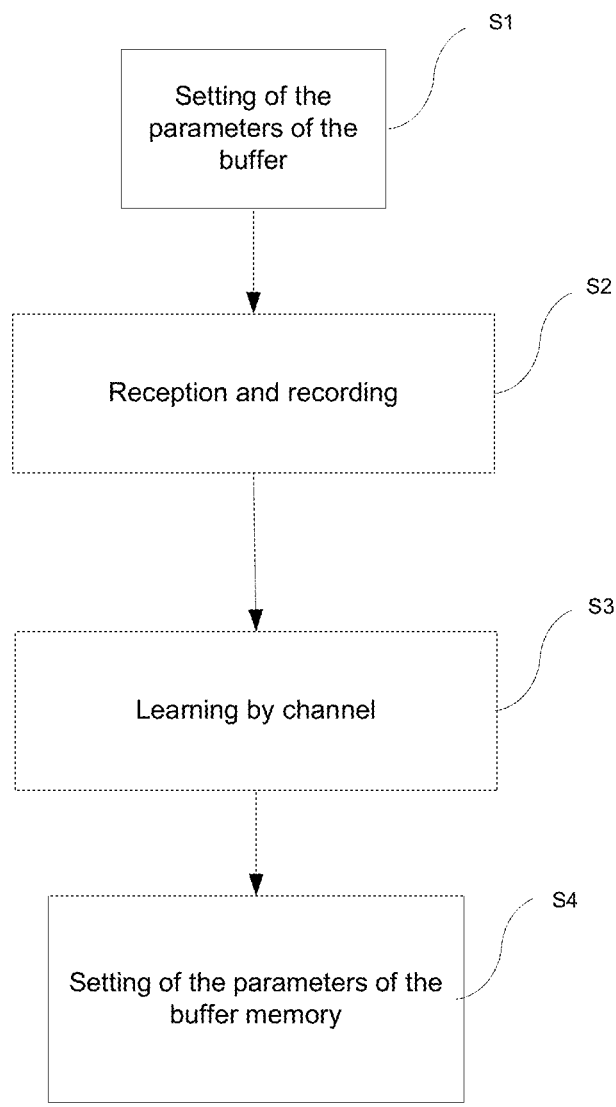
FIG. 16 shows a method according to the invention.

The method according to the fourth invention consists in performing the steps of FIG. 16.

According to a preferred embodiment, this fourth invention relates to a device for receiving and recording data on a recording medium, the device comprising a processor for implementing a timeshift function in a part of the recording medium called timeshift buffer memory; the processor comprising:

means for initialising the buffer memory so as to make its recording time capacity equal to a fixed threshold,
means for analysing during each reception of a data channel at least the average bitrate of each channel,
means for adjusting the recording time capacity of the buffer memory to a value greater than the threshold value according to the at least average bitrate.

During a step S1, a user switches on his decoder and selects a reception channel using his remote control. When the decoder is switched on, the parameters of the timeshift buffer memory BSB and BSS are set to a size defined as minimum. This size is for example 1 GB for BSB and 15 mins for BSS. These so-called minimum sizes can also be set for each decoder or at the factory or by the user or according to the country of use of the decoder or the broadcast network to which the decoder is connected. The data received are then viewed by the user on a television screen connected to the decoder (note that the decoder can be built into the television set and constitute a single device). The data are also recorded in the timeshift buffer memory 32 as they are received, step S2.

During a step S3, the processor 33 analyses the speed at which the timeshift buffer memory is filled in order to analyse the bitrates of the channel received. The average bitrate and accessorily the maximum bitrate are data which enable better setting of the parameters of the timeshift buffer memory. This can be done during the reception of each channel.

The processor 33 observes the bitrate of each channel; it can also observe the bitrate of several channels and take an average over these different channels but in the latter case, the measurement is less reliable than channel by channel. Performing the measurement over a set of channels can be worthwhile if the channels are recognised as quite similar in terms of bitrate.

Preferably, the processor 33 analyses the bitrate of each channel and sets the parameters of the timeshift buffer memory 32 for each channel. The setting of the parameters can be dynamically adjusted when a channel is watched or can be used during the next connection to this channel to set the initial threshold value instead of setting it to a minimum value.

The threshold BSS is thus adjusted according to the average bitrate. However, if the channel has large bitrate variations, it is also worthwhile adjusting the threshold BSS according to the maximum bitrate of the channel.

If it is considered that the bitrate variation on a given network is 50%, the threshold BSS can be calculated thus:

$$BSS=(UBSB-((AvBitRate*1.5)*durationMaxBitRate))/AvBitRate$$

When the threshold depends both on the average bitrate and the maximum bitrate, the threshold BSS can be calculated thus:

$$BSS=(UBSB-(MaxBitRate*durationMaxBitRate))/AvBitRate$$

According to another variant, the threshold BSB representing the capacity limit of the timeshift buffer memory is also set according to the average bitrate.

According to another variant, the threshold BSB is also set according to the average bitrate and the maximum bitrate.

Advantageously, a bitrate reduction can further be combined with this embodiment and its variants. In fact, if a bitrate reduction is achieved, then the user can benefit from a greater recording time limit or at least in an identical time, it is possible to put on more data received.

According to a first variant associated with bitrate reduction, a transcoding of the data is performed during the reception of the data.

FIGS. 6a and 6b described above show this variant. Steps G3 (respectively G'3) to G5 are inserted before or after steps S3 and S4.

According to a second variant associated with bitrate reduction, a bitrate reduction can be applied by recording only certain parts of the data. FIGS. 7a and 7b show such a variant. Steps A2 (respectively A'2) to A4 are inserted before or after steps S3 and S4.

According to a third variant associated with bitrate reduction, the microprocessor 33 records only a part of the groups of data received. When the data are compliant with MPEG coding standards, for example MPEG-2 or MPEG-4 coding standards, the data are coded in the form of groups of images known by the acronym GOP (group of pictures).

FIGS. 8a and 8b show this embodiment. Steps H2 (respectively H'2) and H3 are inserted before or after steps S3 and S4.

FIG. 3 described above also shows a particular embodiment of this invention.

FIG. 9 described above also shows a particular embodiment of this invention.

We will now describe the specific features of the fifth invention.

The method according to the fifth invention consists in performing the steps of FIG. 6a or 6b.

According to a preferred embodiment, this fifth invention relates to a method for receiving and recording audiovisual data on a recording medium, the device comprising a processor for implementing a timeshift function in a part of said recording medium called timeshift buffer memory. According to this invention, the processor comprises means for transcoding the data received in order to reduce the quantity of data to be recorded before recording them in the timeshift buffer memory.

Advantageously, an additional bitrate reduction can be applied by recording only certain parts of the data. FIGS. 7a and 7b described above show such a variant. This additional bitrate reduction can be made before or after the bitrate reduction by transcoding.

Advantageously, an additional bitrate reduction can be applied by recording only certain groups of data. FIGS. 8a and 8b described above show such a variant. This additional bitrate reduction can be made before or after the bitrate reduction by transcoding.

FIG. 3, described above, describes a management with two thresholds of the timeshift buffer memory applicable following the transcoding of the data according to FIG. 6a or 6b and according to the variants described above.

FIG. 9 describes a management with 4 thresholds of the timeshift buffer memory applicable following the transcoding of the data according to FIG. 6a or 6b and according to the variants described above.

FIGS. 10 and 11 describe two first variants of the embodiment described in FIGS. 3 and 9.

In these two variants, intermediary steps between steps T1 and T2 of FIG. 9 or E1 and E2 of FIG. 3 make it possible to set the three thresholds BSS, BSB and MBSS according to the type of data received.

FIG. 10 shows this variant wherein the type of data (or the type of channel) is chosen from among
  audio (a radio service for example),
  HD video (an HD TV service for example),
  SD video (an SD TV service for example),
  An HD audio service and an SD audio service can also be envisaged.

During a test V1 comprised between steps T1 and T2, that is to say during the reception of the data, following a change of channel, the processor 33 determines the type of data received. This type can be determined for example by reading the header or metadata field. In the case of data coded in MPEG-2 or MPEG-4 format, the PMT tables make it possible to detect such a type of data. If the data are audio data then the three thresholds are set with the following thresholds during a step V4:

BSS=BSS_aud
BSB=BSB_aud
MBSS=MBSS_aud

The audio data bitrate is low compared to the video data bitrate, whether SD or HD.

If the data are not audio data, then during a step V2, the processor tests whether the data are SD video data. If the data are SD video data, then the three thresholds are set with the following thresholds during a step V5:

BSS=BSS_SD
BSB=BSB_SD
MBSS=MBSS_SD

If the data are not SD video data, then during a step V3, the processor tests whether the data are HD video data. If the data are HD video data, then the three thresholds are set with the following thresholds during a step V6:

BSS=BSS_HD
BSB=BSB_HD
MBSS=MBSS_HD

Following the setting of the thresholds, we then move to step T2.

FIG. 11 again shows this variant relating to the type of data but the determination of the type of data is not based on audio, SD video, HD video type but on the type of coding used for coding the data.

During a test W1 comprised between steps T1 and T2, that is to say during the reception of the data, following a change of channel, the processor 33 determines the type of data received. This type can be determined for example by reading the header or metadata field. In the case of data coded in MPEG-2 or MPEG-4 (H264) format, the PMT tables make it possible to detect such a type of data. If the data are H264 data, then the three thresholds are set with the following thresholds during a step V4:

BSS=BSS_HD
BSB=BSB_HD
MBSS=MBSS_HD

If the data are not H264 data, then during a test W2, the processor checks whether the data are MPEG-2 data. If the data are MPEG-2 data, then the three thresholds are set with the following values during a step W5:

BSS=BSS_SD
BSB=BSB_SD
MBSS=MBSS_SD

If the data are not MPEG-2 data, following the test of step W2, then the data are for example audio data but can also be data of another type. During a step W6, the three thresholds are set with the following values:

BSS=BSS_X
BSB=BSB_X
MBSS=MBSS_X

Following steps W4, W5 or W6, the processor moves to step T2, if it came from T1 or E2 if it came from E1.

FIG. 12, described above, shows a variant of the invention. In this second variant, intermediary steps between steps T1 and T2 of FIG. 7 or E1 and E2 of FIG. 6 make it possible to set the three thresholds BSS, BSB and MBSS according to the bitrate of the data received.

We will now describe the specific features of the sixth invention.

The method according to the sixth invention consists in performing the steps of FIG. 7a or 7b.

According to a preferred embodiment, this sixth invention relates to a device for receiving and recording audiovisual data on a recording medium, the device comprising a processor for implementing a timeshift function in a part of said recording medium called timeshift buffer memory, the data being coded in a plurality of modes, the modes relating to an audio language or to a subtitling. According to this sixth invention, the processor comprises Means for detecting the mode wherein the data are decoded, Means for recording, in the timeshift buffer memory, the data only in the single decoded mode.

According to a variant associated with bitrate reduction, the microprocessor 33 records only a part of the groups of data received. When the data are compliant with MPEG coding standards, for example MPEG-2 or MPEG-4 coding standards, the data are coded in the form of groups of images known by the acronym GOP (group of pictures).

FIGS. 8a and 8b show this embodiment. This additional bitrate reduction can be performed before or after the bitrate reduction associated with the decoded mode.

An additional bitrate reduction can be applied by transcoding the data received. FIGS. 6a and 6b described above show this embodiment. This additional bitrate reduction can be performed before or after the bitrate reduction associated with the decoded mode.

FIG. 3, described above, describes a management with two thresholds of the timeshift buffer memory applicable following the bitrate reduction applied to the data according to FIG. 7a or 7b and according to the variants described above.

FIG. 9 describes a management with 4 thresholds of the timeshift buffer memory applicable following the bitrate reduction applied to the data according to FIG. 7a or 7b and according to the variants described above.

FIGS. 10 and 11 describe two first variants of the embodiment described in FIGS. 3 and 9.

In these two variants, intermediary steps between steps T1 and T2 of FIG. 9 or E1 and E2 of FIG. 3 make it possible to set the three thresholds BSS, BSB and MBSS according to the type of data received.

FIG. 12, described above, shows a variant of the invention. In this second variant, intermediary steps between steps T1 and T2 of FIG. 7 or E1 and E2 of FIG. 6 make it possible to set the three thresholds BSS, BSB and MBSS according to the bitrate of the data received.

We will now describe the specific features of the seventh invention.

The method according to the seventh invention consists in performing the steps of FIG. 8a or 8b.

According to a preferred embodiment, this seventh invention relates to a device for receiving and recording data on a recording medium, the device comprising a processor for implementing a timeshift function in a part of said recording medium called timeshift buffer memory, the data being audiovisual data coded into groups of video data and into groups of audio data. According to this invention, the device comprises means for recording in the memory only a percentage less than all of the groups of video data received and all the groups of audio data.

Advantageously, an additional bitrate reduction can be applied by recording only certain parts of the data. FIGS. 7a and 7b described above show such a variant. This additional bitrate reduction can be performed before or after the bitrate reduction associated with the decoded mode.

Advantageously, an additional additional bitrate reduction can be applied by transcoding the data received. FIGS. 6a and 6b described above show this embodiment. This additional bitrate reduction can be performed before or after the bitrate reduction associated with the decoded mode.

FIG. 3, described above, describes a management with two thresholds of the timeshift buffer memory applicable following the bitrate reduction applied to the data according to FIG. 7a or 7b and according to the variants described above.

FIG. 9 describes a management with 4 thresholds of the timeshift buffer memory applicable following the bitrate reduction applied to the data according to FIG. 7a or 7b and according to the variants described above.

FIGS. 10 and 11 describe two first variants of the embodiment described in FIGS. 3 and 9.

In these two variants, intermediary steps between steps T1 and T2 of FIG. 9 or E1 and E2 of FIG. 9 make it possible to set the three thresholds BSS, BSB and MBSS according to the type of data received.

FIG. 12, described above, shows a variant of the invention. In this second variant, intermediary steps between steps T1 and T2 of FIG. 7 or E1 and E2 of FIG. 6 make it possible to set the three thresholds BSS, BSB and MBSS according to the bitrate of the data received.

The invention claimed is:

1. Device for receiving and recording data on a recording medium, the device comprising a processor configured for implementing a timeshift function, enabling a deferred reading of said data, in a timeshift buffer memory of said recording medium, wherein said processor is configured for:
    truncating a start of the timeshift buffer memory when a quantity of data recorded in the timeshift buffer memory does not reach a first value a storage duration of the received data in the timeshift buffer memory reaches a second value and data positioned at the start of the timeshift buffer memory have been read; and
    moving to a mode for reading the data of the timeshift buffer memory when the quantity of data recorded in the timeshift buffer memory does not reach the first value, the storage duration of the received data in the timeshift buffer memory reaches the second value, and data positioned at the start of the timeshift buffer memory have not been read;
    recording the data in the timeshift buffer memory as long as the storage duration of the received data in the timeshift buffer memory does not reach the second value.

2. Device according to claim 1 wherein the processor is configured for:
    analyzing during each reception of a data channel an average bitrate of each channel,
    adjusting the first value of the quantity of data recorded and/or the second value of the storage duration according to said average bitrate.

3. Device according to claim 2 wherein
    said analyzing of the average bitrate also comprises analyzing a maximum bitrate of each channel, and;
    said adjusting of the second value of the storage duration comprises adjusting the second value of the storage duration according to said average bitrate and to said maximum bitrate of each channel.

4. Device according to claim 2 wherein
    said analyzing of the average bitrate also comprises analyzing a maximum bitrate of each channel, and
    the first value of the quantity of data recorded is adjusted for each channel according to its average bitrate and its maximum bitrate.

5. Device according to claim 1 wherein the processor is configured for:
    analyzing a type of data received,
    adjusting the second value of the storage duration according to the type of data received.

6. Device according to claim 5 wherein the type of data received belongs to a group comprising:
    Audio data,
    Standard definition video data,
    High definition video data.

7. Device according to claim 1 wherein the processor is configured for
    detecting a reaching of at least a third value relating to the filling of the buffer memory.

8. Device according to claim 7 wherein the processor is configured for:
    detecting the data relating to a selected language and/or to a subtitling,
    recording in the timeshift buffer memory only the data detected.

9. Device according to claim 8 wherein said detecting of the data relating to a language and/or to a subtitling and the recording of only the data detected are applied when said third value is reached.

10. Device according to claim 9 wherein said detecting of the data relating to a selected language and/or to a subtitling and the recording of only the data detected are applied when a first reception bitrate value is reached.

11. Device according to claim 7 wherein the processor is configured for transcoding the data received, said transcoding of the data received being adapted to start a transcoding of the data received when the third value is reached.

12. Device according to claim 11 wherein:
    said detecting enables detecting reaching of at least a fourth value of the filling of the timeshift buffer memory;
    said transcoding of the data received enables transcoding of the data received as long as filling of the timeshift buffer memory is greater than said fourth value.

13. Device according to claim 7 wherein said data received are coded into groups of images and the processor is configured for recording in the timeshift buffer memory only a percentage less than all of the groups of images received when the third value is exceeded.

14. Device according to claim 7 wherein said data received are coded into groups of images and wherein the processor is configured for recording in the timeshift buffer memory only a percentage less than all of the groups of images received when said first reception bitrate value is reached.

15. Device according to claim 1 wherein the processor is configured to start transcoding the data received when a bitrate of the data received is greater than a first reception bitrate value.

16. Device according to claim 15 wherein said processor is adapted to transcode the data received as long as the bitrate of the data received is greater than a second reception bitrate value.

17. Method for receiving and recording data on a recording medium, in a device comprising a processor configured for implementing a timeshift function in a timeshift buffer memory of said recording medium, enabling a deferred reading of said data, wherein the method comprises:
    when a quantity of data recorded in the timeshift buffer memory does not reach a first value and a storage duration of the received data in the timeshift buffer memory reaches a second value:
        truncating a start of the timeshift buffer memory when data positioned at the start of the timeshift buffer memory have been read and
        transitioning to a mode for reading the data of the timeshift buffer memory when data positioned at the start of the timeshift buffer memory have been read;

recording the data in the timeshift buffer memory as long as the storage duration of the received data in the timesift buffer memory does not reach the second value.

* * * * *

UNITED STATES PATENT AND TRADEMARK OFFICE
CERTIFICATE OF CORRECTION

PATENT NO. : 9,641,792 B2  
APPLICATION NO. : 14/412671  
DATED : May 2, 2017  
INVENTOR(S) : Bruno Le Garjan et al.

Page 1 of 1

It is certified that error appears in the above-identified patent and that said Letters Patent is hereby corrected as shown below:

In the Claims

Claim 17 at Column 32, Line 67, change "start of the timeshift buffer memory have been read;" to --start of the timeshift buffer memory have not been read;--; and
    Column 33, Line 3, change "timesift" to --timeshift--.

Signed and Sealed this  
Twenty-fifth Day of September, 2018

Andrei Iancu  
*Director of the United States Patent and Trademark Office*